(12) United States Patent
Suzuki et al.

(10) Patent No.: US 8,451,308 B2
(45) Date of Patent: May 28, 2013

(54) IMAGE FORMING APPARATUS

(75) Inventors: Mitsuo Suzuki, Kawasaki (JP);
Haruyuki Suzuki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 297 days.

(21) Appl. No.: 12/845,421

(22) Filed: Jul. 28, 2010

(65) Prior Publication Data

US 2011/0025813 A1 Feb. 3, 2011

(30) Foreign Application Priority Data

Jul. 31, 2009 (JP) ................................. 2009-178808
Jul. 31, 2009 (JP) ................................. 2009-178810

(51) Int. Cl.
*B41J 27/00* (2006.01)
*B41J 2/435* (2006.01)
*G02B 26/12* (2006.01)

(52) U.S. Cl.
USPC ........... 347/259; 347/260; 347/241; 347/234; 347/237; 347/247; 347/248; 359/199.1

(58) Field of Classification Search
USPC ................. 347/234, 237, 241, 247, 248, 259, 347/260; 359/199.1
See application file for complete search history.

(56) References Cited

U.S. PATENT DOCUMENTS

| 7,157,288 | B2 | 1/2007 | Ito |
| 7,719,737 | B2 | 5/2010 | Amada et al. |
| 2005/0045813 | A1 | 3/2005 | Suzuki et al. |
| 2005/0179971 | A1 | 8/2005 | Amada et al. |
| 2007/0236557 | A1 | 10/2007 | Imai et al. |
| 2008/0068678 | A1 | 3/2008 | Suzuki et al. |
| 2008/0088889 | A1 | 4/2008 | Suzuki |
| 2008/0304124 | A1* | 12/2008 | Yoda .............................. 359/198 |
| 2009/0153933 | A1 | 6/2009 | Tsuchiya et al. |
| 2009/0231656 | A1 | 9/2009 | Suzuki et al. |
| 2010/0046967 | A1 | 2/2010 | Suzuki |
| 2010/0266313 | A1* | 10/2010 | Nakajima ..................... 399/151 |

FOREIGN PATENT DOCUMENTS

| JP | 3498736 | 12/2003 |
| JP | 2005-305771 | 11/2005 |
| JP | 2006-145772 | 6/2006 |

(Continued)

OTHER PUBLICATIONS

Japanese official action dated Feb. 5, 2013 in connection with corresponding Japanese patent application No. 2009-178808.

(Continued)

*Primary Examiner* — Stephen Meier
*Assistant Examiner* — Sarah Al Hashimi
(74) *Attorney, Agent, or Firm* — Cooper & Dunham LLP

(57) ABSTRACT

An image forming apparatus includes an optical scanning unit, a measurement unit, a first adjustment unit and a second adjustment unit. The optical scanning unit includes a plurality of light sources to emit laser beams, a single oscillating mirror deflector to deflect the laser beams used for scan processing in a main scanning direction, and a scan-focusing member to focus the deflected laser beams onto a plurality of photoconductors. The measurement unit measures a resonance frequency of the oscillating mirror deflector. The first adjustment unit adjusts a speed of the photoconductors in a sub-scanning direction. The second adjustment unit adjusts a magnification ratio of image data in the sub-scanning direction. The first adjustment unit and the second adjustment unit adjust the image magnification ratio of image data in the sub-scanning direction depending on the resonance frequency as measured by the measurement unit.

15 Claims, 14 Drawing Sheets

FOREIGN PATENT DOCUMENTS

| | | |
|---|---|---|
| JP | 2006-221030 | 8/2006 |
| JP | 2006-243034 | 9/2006 |
| JP | 2007-199682 | 8/2007 |
| JP | 2007-233235 | 9/2007 |
| JP | 2008-310301 | 12/2008 |
| JP | 2009-31364 | 2/2009 |
| JP | 2009-44824 | 2/2009 |
| JP | 2009-101343 | 5/2009 |
| JP | 2009-139878 | 6/2009 |

OTHER PUBLICATIONS

Japanese official action dated Feb. 5, 2013 in connection with corresponding Japanese patent application No. 2009-178810.

* cited by examiner

SUB-SCANNING DIRECTION
OPTICAL AXIS DIRECTION
MAIN SCANNING DIRECTION

SCAN CENTER
LASER BEAM 20
IMAGE WRITING AREA
PD ARRANGEMENT AREA
SCAN AREA (MAXIMUM OSCILLATION ANGLE)

IMAGE FORMING APPARATUS

CROSS-REFERENCE TO RELATED APPLICATIONS

This application claims priority to Japanese Patent Application Nos. 2009-178808 and 2009-178810, both filed on Jul. 31, 2009 in the Japan Patent Office, which are hereby incorporated by reference herein their entirety.

BACKGROUND OF THE INVENTION

1. Field of the Invention

The present invention relates to an image forming apparatus having a laser-raster optical writing unit.

2. Description of the Background Art

Typically, image forming apparatuses include an optical scanning unit employing a polygon scanner (or polygon mirror) as an optical deflector. With increased demand for high-speed, high-quality image printing using color image forming apparatuses, the polygon scanner is required to rotate at high speeds with great precision, up to 25,000 revolutions per minute (rpm) or more. Further, the polygon scanner is being subjected to use under increasingly heavier load environments to achieve the desired higher image quality printing, involving use of laser beams having smaller beam spot diameters which in turn requires a relatively greater inscribed circle radii and main scanning direction lengths of polygon mirrors.

Such heavier load increases power consumption of the polygon scanner and adversely affects optical elements such as scanning lens due to heat generated by the high speed of rotation of the polygon scanner, in particular that scanning lens which is disposed closest to the polygon scanner.

Moreover, the heat generated by the polygon scanner may be transferred to an optical housing and then transferred to the scanning lens, or may be radiated to the scanning lens directly to increase temperature. In actual apparatuses, such scanning lens may not be uniformly heated, and thereby its temperature does not increase uniformly over the entire area of the scanning lens. For example, distance from a heat generating source (e.g., the polygon scanner) to the scanning lens, differences in coefficient of thermal expansion of material of the scanning lens, flow patterns of air flow in the optical housing, etc., all affect heat transfer to the scanning lens. Specifically, a clear heat gradient over the scanning lens may appear in a main scanning direction, which is also the long direction of the scanning lens.

This heat gradient along the scanning lens in the main scanning direction may change the shape and refractive index of the scanning lens, by which a beam spot position of the laser beam may fluctuate, and thereby image quality deteriorates. Such problem becomes particularly acute when plastic material having a greater coefficient of thermal expansion is used for the scanning lens.

In addition to the above-described problem, because laser beams for each image color (e.g., yellow, magenta, cyan, and black) are scanned in color image forming apparatuses, temperature variation among optical scanning units used for each color also becomes a problem. Such temperature variation causes deviation in the relative positions of the beam spots of each color, resulting in image-color misalignment.

Further still, the heat generated by a polygon mirror operating under heavy load causes a temperature increase, and such temperature increase may induce micro-movement of components of rotating members (especially, polygon mirror having greater mass ratio in the rotating member), unbalancing the rotating members and causing them to vibrate. Components of rotating member may include a polygon mirror, a flange to fix a rotor magnet, a shaft, or the like, and such components may have coefficients of thermal expansion that are different or the same. Even if the coefficients of thermal expansion of components are the same, micro-movement of the components of the rotating members and the resultant imbalance may occur at high-speed rotation at high temperature if parts tolerance and mounting/assembly is not precise, further increasing. Such vibration may be further transmitted to and amplified by optical elements (e.g., reflection mirror) in the optical scanning unit, by which banding may occur, resulting in image quality deterioration and noise generation.

In view of such problems, an oscillating mirror using resonance phenomenon has been researched, in an effort to use the oscillating mirror as an equivalent of and replacement for a polygon mirror deflector. An oscillating mirror deflector, having a resonance structure oscillate-able by using sine wave, can reduce its size, and deflection scanning can be conducted using a single oscillating mirror. Such oscillating mirror may be provided with a correction unit to correct magnification ratio of image data in a sub-scanning direction depending on oscillation frequency of oscillating mirror, and a speed changer to change a moving speed of a photoconductor drum in a sub-scanning direction, as disclosed in JP-2006-243034-A. An image forming apparatus employing such oscillating mirror can reduce power consumption, and prevent or suppress temperature increase of the scanning lens disposed in an optical scanning unit, and reduce temperature variation and vibration of the optical scanning units in color image forming apparatuses.

In an image forming apparatus using an oscillating mirror employing resonance phenomenon as a deflector, when a rotation moving speed of photoconductor is changed, or image resolution is changed, a drive frequency Fd of the deflector (i.e., the oscillating mirror) is changed and set to a drive frequency corresponding to an operating condition. However, such drive frequency Fd may not match a resonance frequency Fr of the deflector (i.e., oscillating mirror), by which amplitude of oscillating mirror may become smaller. JP-2005-305771-A discusses a method of solving such problem, in which, by shifting resonance characteristic of the deflector when the drive frequency Fd is changed, the resonance frequency Fr of the deflector which shows a maximum amplitude can be substantially matched to the drive frequency Fd of the deflector. An image forming apparatus employing such oscillating mirror can reduce power consumption, suppress temperature increase of the scanning lens disposed in an optical scanning unit, and reduce temperature variation and vibration of optical the scanning units in color image forming apparatuses.

However, because the oscillating mirror uses resonance phenomenon, a size/shape error of a reflector and bar beam set around the oscillating mirror may change the resonance frequency of the oscillating mirror. Further, a size tolerance for a reflector having a size of several millimeters may need to be on the order of micrometers ($\mu m$) or less, but current processing techniques may not be able to satisfy such processing precision requirements. Accordingly, mass-produced oscillating mirrors may exhibit resonance frequency variation, by which image magnification ratio error may occur when an image forming operation is conducted.

Further, environment temperature change may change rigidity such as Young's modulus of bar beam. As a result, the resonance frequency may vary, and thereby magnification ratio error may fluctuate due to the change of rigidity of the bar beam over time.

Even in JP-2006-243034-A, resonance frequency variation of oscillating mirrors may become a problem, wherein such resonance frequency variation pattern may be included when the oscillating mirrors are manufactured and caused by ambient temperature changes over time. Such resonance frequency variation may cause fluctuations in image magnification ratio during image printing operations, depending on installation environment of the image forming apparatus and when a greater number of image are printed, for example.

Further, in JP-2005-305771-A, resonance frequency of the oscillating mirror may be changed to match the resonance frequency and a drive frequency of the oscillating mirror with each other. Such frequency matching may be conducted using an electrical resistance element, in which the electrical resistance element is used to change the temperature of a twisted spring to change the resonance frequency of the oscillating mirror. However, such method may take a longer time, and image forming operations cannot be conducted during such frequency matching process.

Further, even if the drive frequency and resonance frequency can be matched with each other by changing the image resolution, the resonance frequency of oscillating mirror of resonance type may change due to ambient temperature changes, by which a desired amplitude may not be obtained due to temperature changes in the image forming apparatus over time.

SUMMARY

In one aspect of the present invention, an image forming apparatus is devised. The image forming apparatus includes an optical scanning unit, a measurement unit, a first adjustment unit and a second adjustment unit. The optical scanning unit includes a plurality of light sources to emit laser beams, a single oscillating mirror deflector to deflect the laser beams used for scan processing in a main scanning direction, and a scan-focusing member to focus the deflected laser beams onto a plurality of photoconductors. The measurement unit measures a resonance frequency of the oscillating mirror deflector. The first adjustment unit adjusts a speed of the photoconductors in a sub-scanning direction. The second adjustment unit adjusts a magnification ratio of image data in the sub-scanning direction. The first adjustment unit and the second adjustment unit adjust the image magnification ratio of image data in the sub-scanning direction depending on the resonance frequency as measured by the measurement unit.

In another aspect of the present invention, an optical scanning unit for an image forming apparatus is devised. The optical scanning unit includes a plurality of light sources to emit laser beams, a single oscillating mirror deflector to deflect the laser beams used for scan processing in a main scanning direction, a scan-focusing member to focus the deflected laser beams onto a plurality of photoconductors, a measurement unit to measure a resonance frequency of the oscillating mirror deflector, a first adjustment unit to adjust a speed of photoconductors in the sub-scanning direction, and a second adjustment unit to adjust a magnification ratio of image data in the sub-scanning direction. Depending on the resonance frequency as measured by the measurement unit, an image magnification ratio of image data in the sub-scanning direction position is adjusted using the first adjustment unit and the second adjustment unit.

In another aspect of the present invention, a method of adjusting a drive frequency of an oscillating mirror deflector used for an optical scanning unit of an image forming apparatus is devised, in which the optical scanning unit includes a plurality of light sources to emit laser beams, a single oscillating mirror deflector to deflect the laser beams used for scan processing in a main scanning direction, a scan-focusing member to focus the deflected laser beams onto a plurality of photoconductors. The method comprising the steps of detecting a difference between a resonance frequency and a drive frequency of the oscillating mirror deflector; and adjusting the drive frequency to the resonance frequency by matching the drive frequency to the resonance frequency using a control unit if the difference is out of a desired range.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
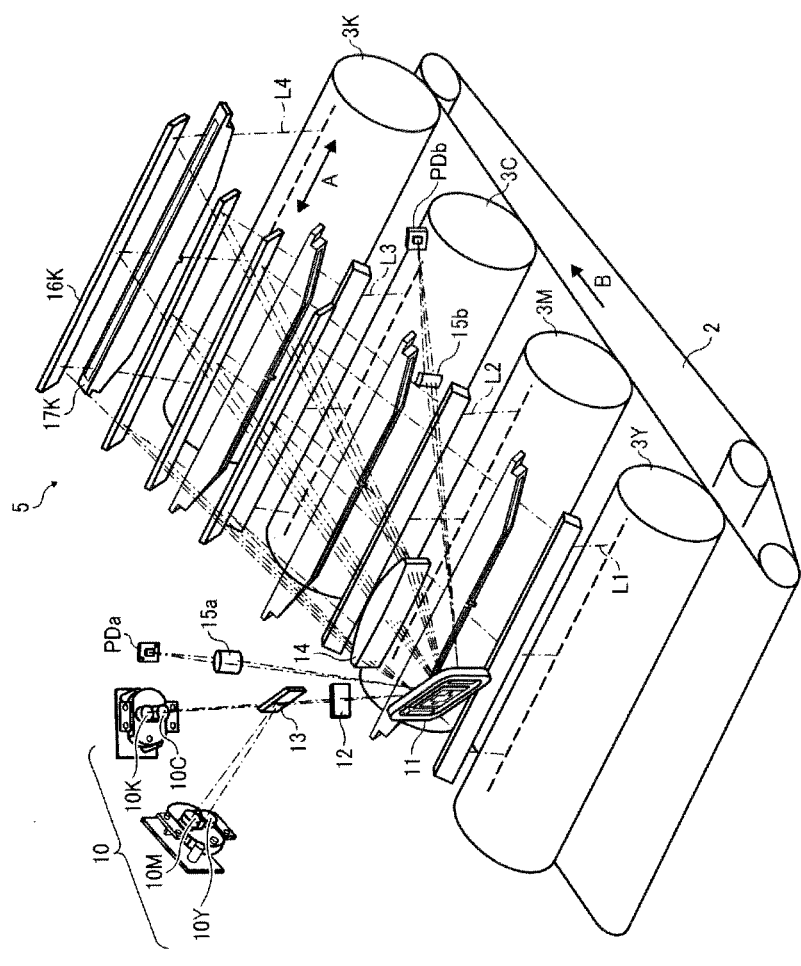
FIG. 1 shows a schematic perspective view of an optical scanning unit according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, Operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner. Referring now to the drawings, an image forming apparatus according to example embodiments are described hereinafter.

Figure 2:
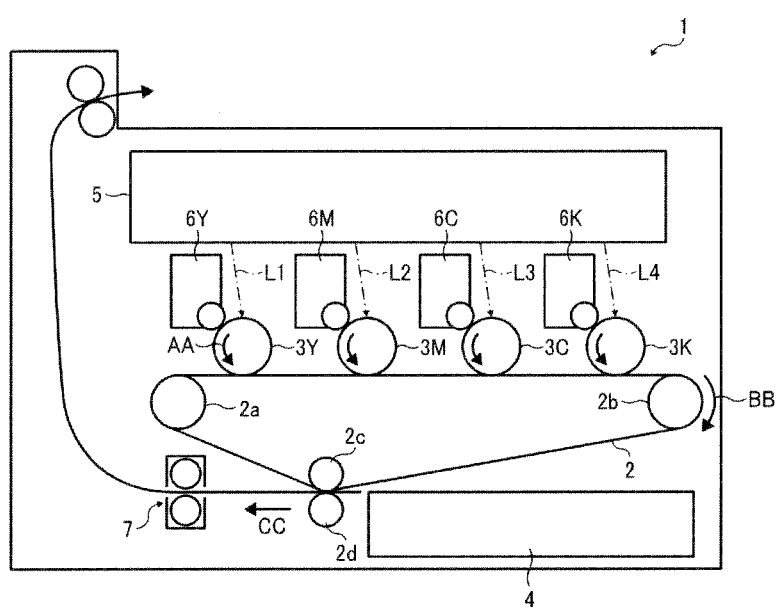
FIG. 2 shows a schematic cross section view of an image forming apparatus according to an example embodiment.

FIG. 1 shows a schematic perspective view of an optical scanning unit 5 according to an example embodiment, and FIG. 2 shows a schematic cross section view of an image forming apparatus 1 employing the optical scanning unit 5. The optical scanning unit 5 may be disposed over an image forming unit having arranged four photoconductor drums 3Y, 3M, 3C, 3K in the image forming apparatus 1 as shown in FIG. 2. Hereinafter, suffix letters of Y, M, C and K indicate yellow, magenta, cyan and black (Y: yellow, M: magenta, C: cyan, K: black), and suffix letters of Y, M, C, K may be attached as required.

The optical scanning unit 5 may include a light source 10, an oscillating mirror 11, and light guiding member(s) for scan/focus optical system, for example, which are housed in an optical housing. The light source 10 may include four light sources corresponding to each color. The oscillating mirror 11 is used as a light deflector, which deflects a direction of each laser beam coming from each light source 10. The light guiding member(s) for scan/focus optical system guide the each light beam to each of the photoconductor drums 3Y, 3M, 3C, 3K, which is scanned by the each light beam. The light guiding member(s) may be referred to as scan-focusing member.

As shown in FIG. 1, the light source 10 may include four light source units 10Y, 10M, 10C, 10K corresponding to each color. Each light source unit 10 may be configured with a semiconductor laser and a coupling lens, for example. Four semiconductor lasers emit luminous flux to be used for writing each of yellow, magenta, cyan, black color images. The luminous flux emitted from each semiconductor laser is converted to given luminous flux condition, adapted to an optical path after the coupling lens. Such adapted luminous flux condition may be parallel luminous flux, luminous flux having smaller divergence, or convergence luminous flux. Then, the light reflects at a reflection mirror 13, and enters a cylindrical lens 12. The light is then converged in a sub-scanning direction by the cylindrical lens 12, and focused on a reflector (such as reflection face) of oscillating mirror 11 used as deflecting scanning unit. The light may be focused on the reflector to form one line image in a main scanning direction.

A laser transmittable member, not shown, may be disposed at a light entering side of the oscillating mirror 11. Luminous flux of each color emitted at the light source 10 enters the oscillating mirror 11 via the laser transmittable member. With an effect of oscillation movement of the oscillating mirror 11, luminous flux of four colors can be deflected in a substantially same direction, and then pass through a first lens 14, wherein the first lens 14 is one of scanning lens used as light guiding member for scan-focus optical system.

Luminous flux (e.g., upper end position of lens) to write a black image is reflected by a mirror 16K, and then passes through a second lens 17K, which is one of the scanning lens groups, and then focuses on a photoconductor drum 3K. Specifically, luminous flux for black image scans a surface of the photoconductor drum 3K, which is a scanned-face, in a direction shown by an arrow A. The first lens 14 and second lens 17K, which is included in the scanning lens group, may be made of plastic material, which can be shaped in an aspherical lens easily with reduced cost. Specifically, polycarbonate, which has good level of low water absorption, high transmission rate, higher formability, may be used preferably, or synthetic resin including such polycarbonate as main component may be used preferably.

Luminous fluxes to write yellow, magenta, and cyan images are similarly reflected at a mirror, pass through a lens, focus on a photoconductor drum at a light beam spot, and the luminous fluxes for yellow, magenta, and cyan images are scanned on photoconductor drums to form electrostatic latent images for yellow, magenta, and cyan images on the photoconductor drums. Although reference characters for yellow, magenta, and cyan may not be attached for optical elements in drawings, optical elements used for black image may be positioned at a similar position for yellow, magenta, and cyan images.

The electrostatic latent images are developed as toner images of each color using development units, which supply toner of each color, and each of the toner images is transferred onto an intermediate transfer belt 2. When transferred onto the intermediate transfer belt 2, the toner images are superimposed to form a color image. The color image may be transferred onto a recording medium such as a sheet, and fixed on the recording medium. After such color image transfer process, the intermediate transfer belt 2 may be cleaned by a cleaning unit, for example.

As such, luminous fluxes emitted from a plurality of light source units 10 are deflected to a substantially same direction using the oscillating mirror 11 (used as deflection scanning unit), wherein each of luminous fluxes is corresponded to each of color images. Each deflected luminous flux may pass through a scan-focus optical path for each color. Specifically, each deflected luminous flux passes through the first lens 14, and each deflected luminous flux passes through the second lens separately disposed for each color. For example, luminous flux for black passes through the second lens 17K. Then, each luminous flux is focused on a surface of each photoconductor used for each color image to scan the surface of each photoconductor. Such scan-focus units may be prepared for four units corresponding to each color. As such, the luminous flux or light beam optically scans the surface of a photoconductor (i.e., surface of scanned object) to write an image on the photoconductor. The optical scanning unit 5 shown in FIG. 1 can be configured as such.

Each laser beam entering the reflector of oscillating mirror 11 enters the reflector with a given incident light angle with respect to a sub-scanning direction, in which light laser beams enter the reflector of oscillating mirror 11 from an oblique direction with respect to a horizontal direction. Such oblique incidence angle may be set to five or less degrees as a greatest incidence angle for laser beam. If the incident light angle is set too greater (e.g., greater than five degrees), the scanning line may be curved greatly on a scanned face of scanned object (e.g., photoconductor), and a laser beam may have a greater beam diameter, by which image deterioration may occur.

On the other hand, if each laser beam does not enter the reflector with an oblique incident angle but enters the reflector from a horizontal direction (i.e., oblique incident angle is zero), a width in the sub-scanning direction on the reflector may need set greater, by which the oscillating mirror 11 may be loaded with a higher load, and thereby oscillating frequency of the oscillating mirror 11 may not be increased to a higher level.

The scanning lens group such as lenses 14, 17 may be fixed on an inner face of optical housing adhesives. For example, lenses 14 and 17 may be fixed on the optical housing only at a center portion of lens in a main scanning direction. Such center portion adhesion may prevent or suppress an effect of shape change of lens. Specifically, when a lens is fixed on the optical housing at a center portion of lens, the lens may freely expand its shape from the center portion to its each end portion when heat is applied to the lens. Such free expansion of lens may prevent irregular shape change at a local portion of lens, by which degrading of magnification ratio error at the local portion of lens in the main scanning direction may be prevented or suppressed. The scanning lens group may be fixed on the optical housing adhesives in view of reducing the number of parts such as fixing parts, simplifying a fixing process, and resultant low manufacturing cost.

Figure 3A:
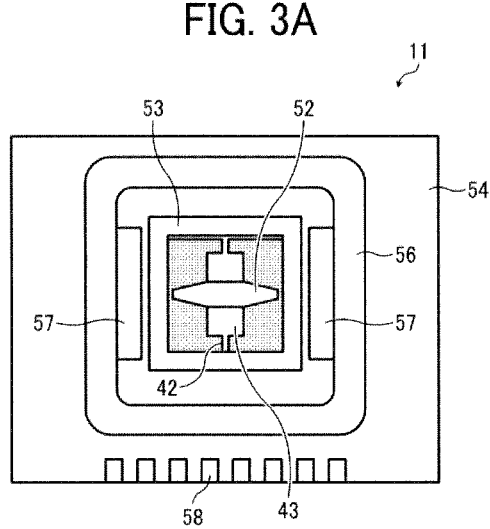
FIG. 3A shows a first substrate of oscillating mirror according to an example embodiment.
Figure 3B:
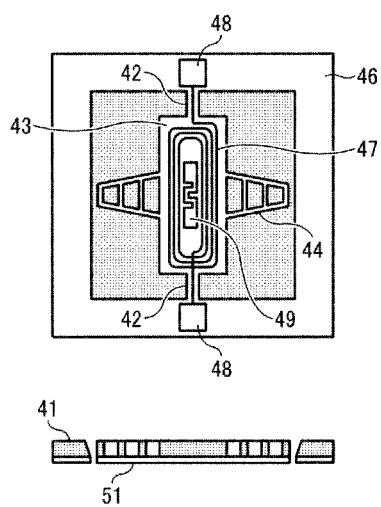
FIG. 3B shows a second substrate of an oscillating mirror according to an example embodiment.
Figure 4:
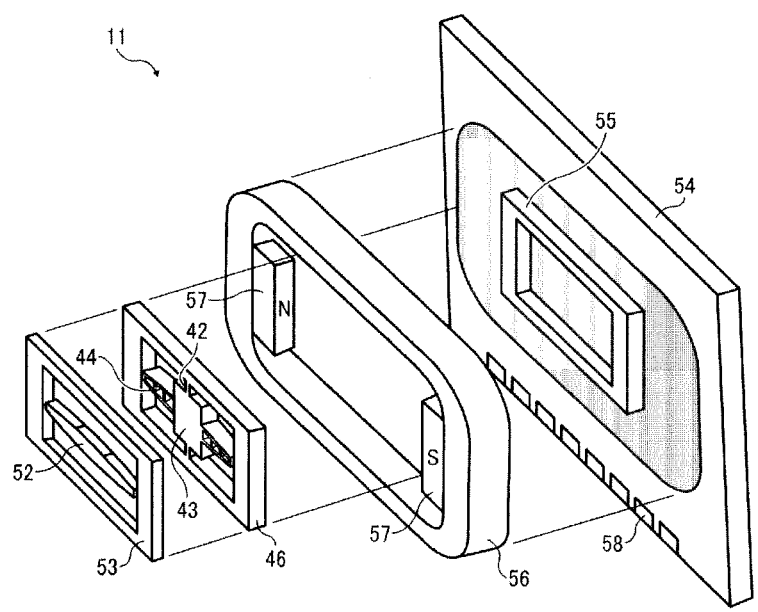
FIG. 4 shows an exploded perspective view of the oscillating mirror according to an example embodiment.

A description is now given to the oscillating mirror 11 according to an example embodiment with reference to FIGS. 3 and 4. FIG. 3A shows a first substrate of the oscillating mirror 11, and FIG. 3B shows a second substrate of the oscillating mirror 11 in detail. FIG. 4 shows an exploded perspective view of the oscillating mirror 11. The oscillating mirror 11 may include a movable member, a twistable beam, and a frame, for example. The movable member may be used as an oscillating member having formed with a mirror face on a surface of oscillating member. The twistable beam may support the movable member, and can be used as a rotation axis of the movable member. The frame may be used to support the movable member and twistable beam. The oscillating mirror 11 may be formed from a silicon (Si) substrate using an etching.

In an example embodiment, the oscillating mirror 11 may be prepared from a wafer, which is prepared by bonding two silicon-on-insulator (SOI) substrates interposing an oxide film between the two SOI substrates. For example, one substrate has a thickness of 60 μm, and other substrate has a thickness of 140 μm. First, a dry etching process such as plasma etching is applied to a surface of 140 μm substrate (referred to as second substrate 41) to remove a given area from the substrate to retain areas to be used as specific parts such as a twistable beam 42, an oscillation plate 43 formed with a planar coil, a re-enforcement beam 44 used as a support frame of the movable member, and a frame 46. Portions of the substrate other than such parts are penetrated to the oxide film by the plasma etching. Then, an anisotropic etching using KOH solution is applied to a surface of 60 μm substrate (referred to as first substrate 51) to remove a given area from the substrate to retain areas to be used as specific parts such as a movable mirror member 52, and a frame 53. Portions of the substrate other than such parts are penetrated to the oxide film by the anisotropic etching. Then, the oxide film around the movable member is removed to form a structure used for the oscillating mirror 11.

The twistable beam 42 and the re-enforcement beam 44 may have a width from 40 μm to 60 μm, for example. The moment of inertia I of oscillating member is set smaller to set a greater oscillation angle for oscillating member. Because a mirror face of oscillating member may be deformed by the inertia force, the movable member may have a thickness thinning structure in an example embodiment, for example. Further, the surface of 60 μm substrate (first substrate 51) may be coated with a thin aluminum film to set a reflector thereon. The surface of 140 μm substrate (second substrate 41) may be coated with a thin cupper film to form a coil pattern, terminals 48 wired to the coil pattern via the twistable beam 42, and a patch 49 for trimming. Further, in another case, a thin film permanent magnet may be formed on the oscillation plate 43, and a planar coil may be formed on the frame 53.

As illustrated in FIG. 4, an installation substrate 54 may include a mount base 55 and a yoke 56, in which the mount base 55 is used for attaching the movable mirror member 52, and the yoke 56 is formed with a shape that encircles the movable mirror member 52. The yoke 56 may include a S-pole and a N-pole, which are counter-facing to each other while being positioned at each end of the movable mirror member 52. Such S-pole and N-pole may be used as a pair of permanent magnets 57 to generate a magnetic field in a direction perpendicular to a rotation axis of the movable mirror member 52 (see FIG. 4).

The movable mirror member 52 may be attached to the mount base 55 while facing the mirror face to an outside direction. When an electric current runs between the terminals 48, a Lorentz force is generated at each side parallel to a rotation axis of the coil pattern, by which the twistable beam 42 is twisted to generate a rotation torque T that rotates the movable mirror member 52. When the electric current is shutdown, the movable mirror member 52 returns to a reference position with an effect of returning force of the twistable beam 42.

Accordingly, by changing running directions of electric current running in the coil pattern alternately (using alternating current signal), the movable mirror member 52 can be reciprocally oscillated. If a switching cycle of electric current is set closer to an eigenfrequency (or resonant frequency fr0) of primary oscillation mode of structure of the oscillating mirror 11 having the twistable beam 42 as a rotation axis, an amplitude can be excited, by which a greater oscillation angle can be set.

Further, when a direct electric current runs in the coil pattern (i.e., voltage is applied), the movable mirror member 52 can be changed statically (change of amplitude center). However, because resonance phenomenon is used, an angle change using electric current may be within a given range such as plus/minus one degrees. Such direct current component is super-positioned to the above described alternating current signal, by which the amplitude center of the oscillating mirror 11 can be changed while oscillating the oscillating mirror 11 with an given amplitude.

Figure 5:
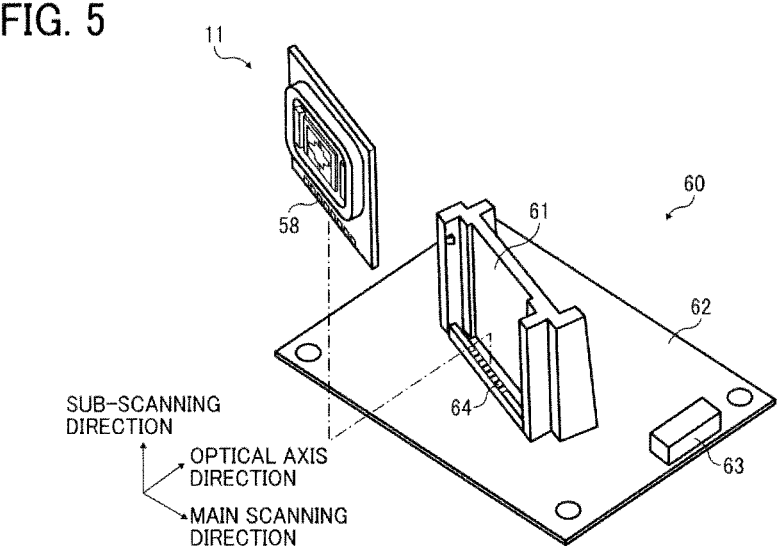
FIG. 5 shows an oscillating mirror unit to be installed in an optical housing according to an example embodiment.

FIG. 5 shows an oscillating mirror unit 60, which may be disposed in an optical housing. The oscillating mirror unit 60 may include a bracket 61, and a base plate 62, for example. The bracket 61 supports and fixes the oscillating mirror 11, and includes an electrode member 64 for electrical connection with the oscillating mirror 11. The bracket 61 is fixed on the base plate 62 including an electrical connector 63. The base plate 62 is disposed in the optical housing.

The oscillating mirror 11 includes the movable member having a given mass and inertia, which are significantly smaller than a conventional polygon mirrors, by which a driving unit of oscillating mirror 11 can be reduced in size. Further, a magnetic circuit can be used with higher efficiency, by which power consumption of the oscillating mirror 11 can be reduced. For example, the power consumption of oscillating mirror 11 can be reduced to one-tenth (i.e., 1/10) of polygon mirror. Therefore, when the oscillating mirror 11 is employed, heat generation can be reduced, and temperature increase of optical elements used for optical path of an optical writing unit and an optical housing itself can be prevented. Therefore, local heat gradient such as local temperature increase may not occur to a scanning lens, made of resin material, by which scanning position of laser beam during image forming process such as color image forming may not be fluctuated, and thereby image-color misalignment can be prevented.

Further, because the movable member has relatively smaller mass and inertia, vibration transmitted from the movable member to other members, devices, or units when the movable member is in oscillation movement can be reduced, wherein such vibration may be caused by mass imbalance. For example, vibration of the oscillating mirror 11 can be reduced to one-hundredth (i.e., 1/100) of vibration of polygon mirror. Therefore, vibration may not be transmitted to optical elements used for optical path of an optical writing unit and an optical housing. Therefore, vibration of reflection mirror can be prevented, by which banding phenomenon during an image forming process can be prevented, wherein the banding phenomenon may be appeared as image concentration variation in sub-scanning direction of image.

Further, FIG. 2 shows the image forming apparatus 1 employing the optical scanning unit 5 and a plurality of the photoconductor drums 3Y, 3M, 3C, 3K arranged in tandem, which may be used as a color image forming apparatus. The image forming apparatus 1 may include the optical scanning unit 5, development units 6, the photoconductor drums 3, the intermediate transfer belt 2, a fixing unit 7, and a sheet feed unit 4 from upper to bottom of image forming apparatus 1, for example.

The photoconductor drums 3Y, 3M, 3C, 3K for each color are arranged over the intermediate transfer belt 2 in tandem with a same interval. The photoconductor drums 3Y, 3M, 3C, 3K have a same diameter, and are surrounded by members and units for electrophotography process arranged with a given order. For example, the photoconductor drum 3Y may be surrounded by a charger, the development unit 6Y, a transfer charger, and a cleaning unit arranged with a given order. The photoconductor drum 3Y may be scanned by laser beam L1 emitted from the optical scanning unit 5, which is generated from image signal. Similar arrangement is set for the photoconductor drums 3M, 3C, 3K. As such, in an example embodiment, surface of the photoconductor drums 3Y, 3M, 3C, 3K are scanned by laser beams L1, L2, L3, L4 emitted from the optical scanning unit 5.

The photoconductor drum 3Y uniformly charged by the charger, may rotate in a direction shown by an arrow AA while the laser beam L1 scans the surface of the photoconductor drum 3Y to form an electrostatic latent image on the photoconductor drum 3Y. At a downstream of rotation direction of the photoconductor drum 3 from a laser irradiation position of the laser beam L1, the development unit 6Y is disposed to supply yellow toner to the photoconductor drum 3Y. Such yellow toner supplied by the development unit 6Y may adhere the electrostatic latent image to form a toner image. Similarly, single color toner images of M, Y, K may be formed on the photoconductor drums 3M, 3C, 3K.

At a downstream of rotation direction of the photoconductor drums 3, the intermediate transfer belt 2 is disposed. The intermediate transfer belt 2 may be extended by a plurality of rollers 2a, 2b, 2c, and can be moved in a direction shown by an arrow BB using a motor drive. With such movement of the intermediate transfer belt 2, the intermediate transfer belt 2 may move along the photoconductor drums 3Y, 3M, 3C, 3K sequentially. The single color images developed on the photoconductor drums 3Y, 3M, 3C, 3K are superimposingly transferred onto the intermediate transfer belt 2 sequentially to form a color image on the intermediate transfer belt 2.

Then, a transfer sheet is transported from a sheet feed tray 1 in a direction shown by an arrow CC to transfer the color image onto the transfer sheet. The transfer sheet is then transported into the fixing unit 7 for fixing image on the transfer sheet, and then the transfer sheet fixed with the color image is ejected outside the image forming apparatus 1.

Figure 6:
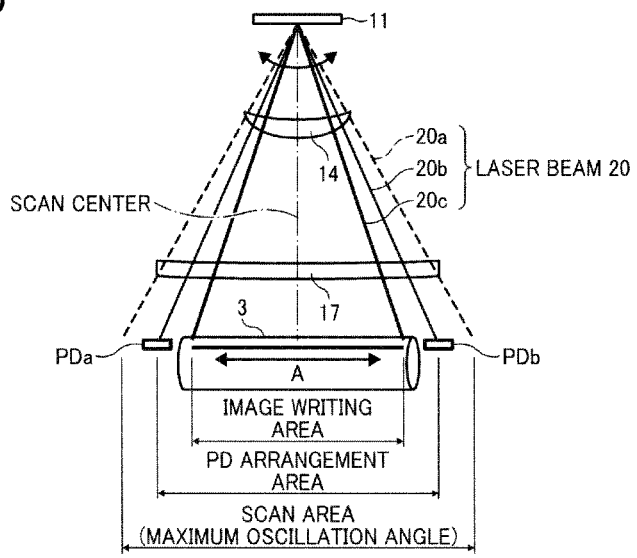
FIG. 6 shows a schematic configuration around a photoconductor drum in an optical scanning unit according to an example embodiment.

The oscillating mirror 11 of the optical scanning unit 5 may be effectively used with a following controlling method, for example. FIG. 6 shows a schematic configuration of an optical scanning unit for color image forming and the photoconductor drum 3 shown in FIG. 1. The oscillating mirror 11 deflects a laser beam 20 to scan a surface of the photoconductor drum 3. Such laser beam 20 may be categorized in three laser beams depending on scanning position of the laser beam 20. Specifically, the laser beam 20 may be referred to laser beams 20a, 20b, and 20c for the purpose of explanation as shown in FIG. 6. The laser beam 20a is a beam that comes to a position when the oscillation angle of oscillating mirror 11 becomes a maximum angle. The laser beam 20b is a beam that enters light receiving elements PDa and PDb, disposed within the maximum oscillation angle, and the laser beam 20b enters the light receiving elements PDa and PDb at a given timing, and the light receiving elements PDa and PDb output signals when the light receiving elements PDa and PDb receive the laser beam 20b. The light receiving elements PDa and PDb may be a photodiode, but not limited thereto. The laser beam 20c is a beam that scans an end portion of image writing area of the photoconductor drum 3.

Figure 7:
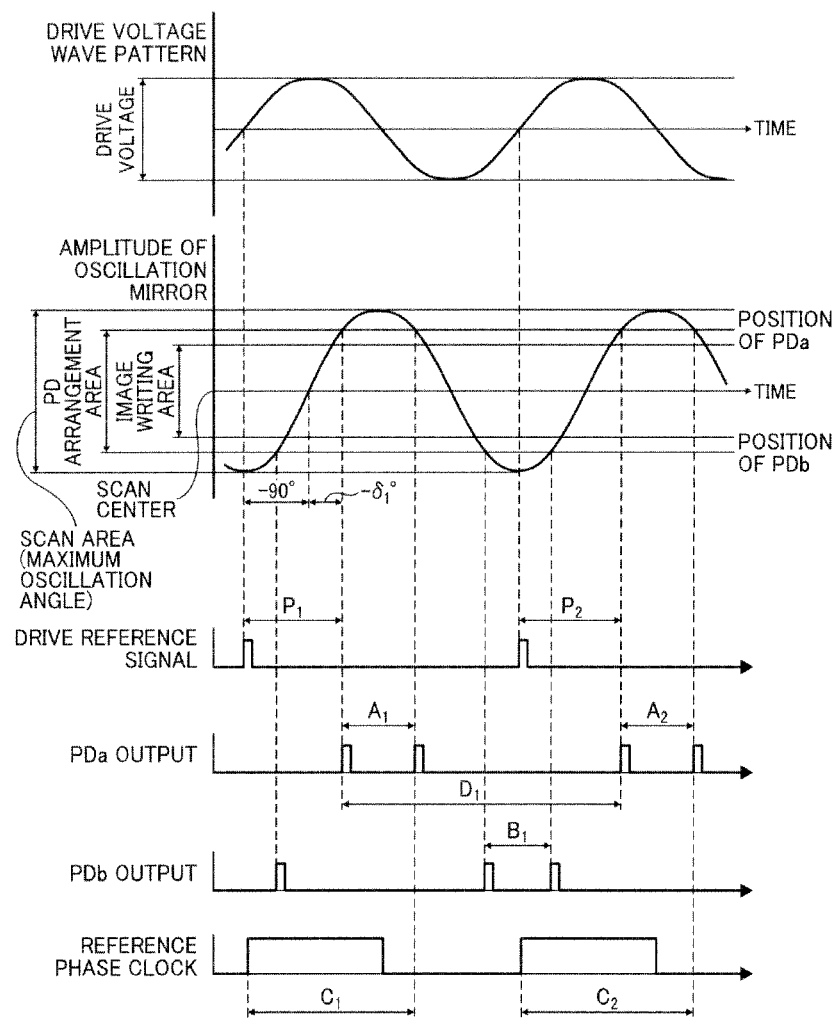
FIG. 7 shows a wave pattern of oscillating mirror amplitude over time according to an example embodiment.

FIG. 7 shows an example pattern of amplitude of the oscillating mirror 11 with respect to time. Resonance phenomenon is used for the oscillating mirror 11 to generate a relatively greater amplitude, which follows, for example, a sine wave pattern with respect to time. When no scanning lens is employed, scanning speed of laser beam is not constant but becomes different at different scanning positions on the photoconductor drum 3. The scanning lens group such as the first lens 14 and second lens 17 has f-arcsine characteristic so that the scanning speed of laser beam can be set to a constant level at each scanning position. Such scanning lens may be used as scan-focusing member.

Figure 8:
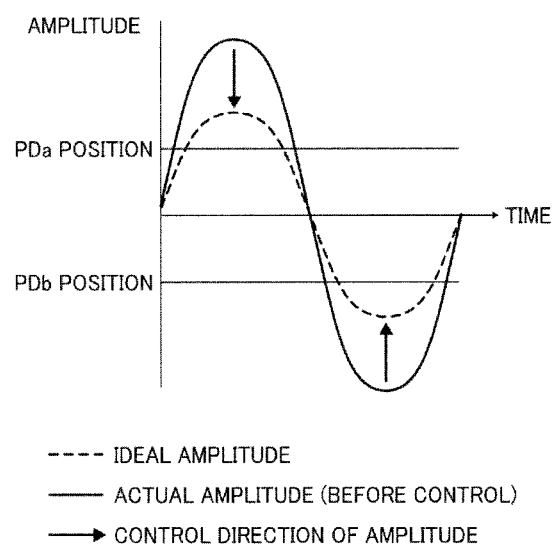
FIG. 8 shows an amplitude variation (fluctuation) due to oscillation movement of the oscillating mirror according to an example embodiment.
Figure 9A:
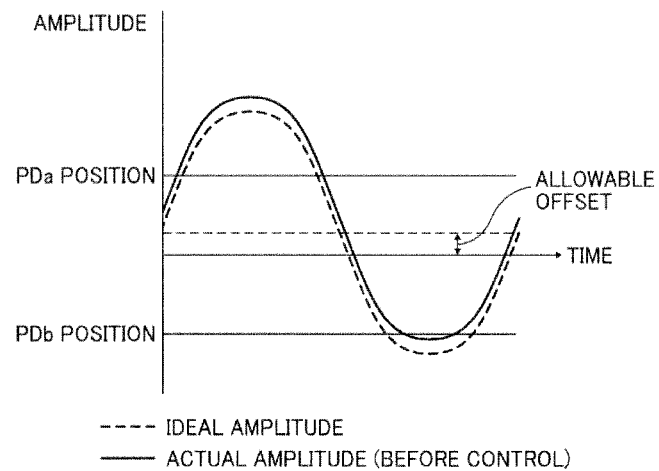
FIGS. 9A and 9B show amplitude position changes due to oscillation movement variation of the oscillating mirror according to an example embodiment.
Figure 9B:
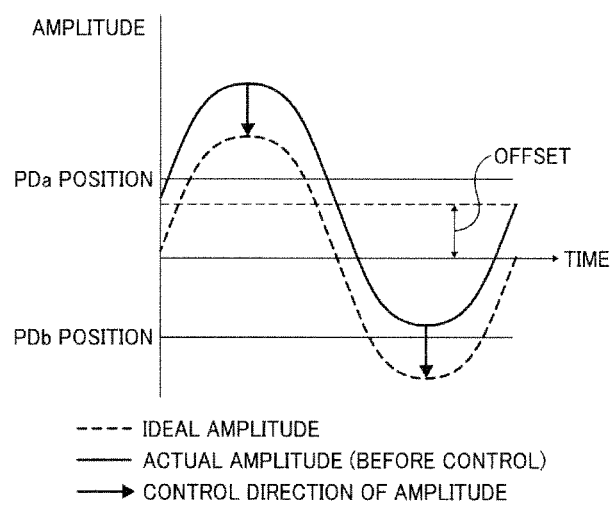
Figure 10:
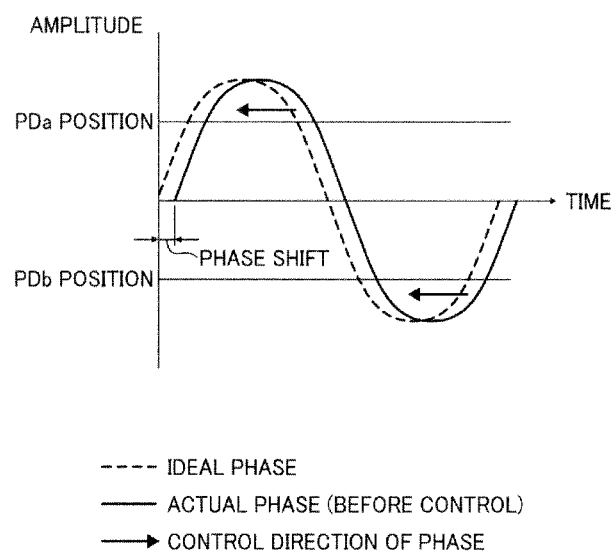
FIG. 10 shows a phase shift due to oscillation movement variation of the oscillating mirror according to an example embodiment.

Even if the scanning lens group having f-arcsine characteristic is used, variation or fluctuation may occur to oscillation movement of the oscillating mirror 11 as shown in FIGS. 8, 9, and 10. Such variation or fluctuation of oscillation movement may be suppressed by conducting a given controlling method. Further, even if a resonance frequency of the oscillating mirror 11 is set to a constant level, phenomenon shown in FIGS. 8, 9, and 10 may occur, in which ideal amplitude wave pattern (sine wave pattern shown by a dotted line) may not occur, by which scanning position of laser beam may fluctuate, and image quality deterioration may occur.

FIG. 8 shows an example case of amplitude variation (or fluctuation). When the amplitude becomes greater (or smaller than) than a reference value, a wave pattern may be controlled in a direction shown by an arrow to set the amplitude at a preferable level. The control may be conducted to set a time interval A of PDa output and a time interval B of PDb output (see FIG. 7) at a same value. Specifically, averaging computation such as $(A_1+B_1)/2$, $(A_2+B_2)/2$, ... is conducted for a plurality of times to set a target value used for controlling, which is uniquely determined from the resonance frequency.

FIGS. 9A and 9B show example cases of position relationship between an amplitude center of the oscillating mirror 11 and a scan center, in which there is an offset for amplitude center of wave pattern with respect to the scan center. The offset is a difference between the amplitude center of the oscillating mirror 11 and the scan center. FIGS. 9A and 9B show different patters having different offset amount. FIG. 9A shows a pattern that the offset amount is within an allowable level, and FIG. 9B shows a pattern that the offset amount is not within an allowable level. The offset amount may affect optical scanning characteristic such as linearity and beam spot diameter, but the offset amount may not need to be set to zero in view of the effect of offset to image.

Specifically, to suppress the offset effect to the linearity, light activation timing of laser beam is controlled based on image information to correct linearity error, and also to suppress the offset effect to the beam spot diameter, light intensity (or integrated light amount) is controlled so that electrostatic latent images on a photoconductor drum may have substantially same level.

Further, such offset control may not be conducted if deviation is within an allowable offset range. For example, an allowable offset amount for linearity can be set as one percent or less deviation from a design value, and an allowable offset amount for beam spot diameter can be set as ten percent or less deviation from a design value. Within the allowable offset range, the offset effect to image can be suppressed, and the offset correction control may not be conducted because a problem may not occur.

FIG. 9B shows an example pattern that the offset amount is not within an allowable level (or offset amount exceeds the allowable level). In such a case, it is required to adjust (or correct) offset amount within the allowable offset range. The adjustment can be conducted as below. A direct current component corresponding to the offset amount is super-positioned to a drive voltage (or alternating current component) of the oscillating mirror 11 to change a setup position of the oscillating mirror 11 in a main scanning direction, by which the amplitude center is adjusted within the allowable offset range.

Further, in another case, the setup position of the oscillating mirror 11 can be changed and adjusted using a drive unit. Such drive unit may use a stepping motor disposed under the base plate 62 shown in FIG. 5, in which the rotation axis of stepping motor and the oscillating axis of oscillating mirror 11 are aligned. By changing the setup position (or rotation) of the oscillating mirror 11 about the oscillating axis in the oscillating mirror unit 60, an offset amount can be adjusted within the allowable offset range. The stepping motor may be required to have a rotation step resolution, which is at least one half or less of allowable offset amount.

Such offset adjustment can be applied to an actual apparatus. However, conventional offset adjustment method may adjust the offset amount to "zero" which is an ideal condition but may not use a concept of allowable offset used in an example embodiment. If the offset amount is adjusted to "zero," a superposition circuit for super-positioning a direct current component for offset adjustment may need to output a greater output voltage that can adjust offset amount (e.g., FIG. 9B) completely. Such superposition circuit may have a greater circuit size, and generate too much heat, by which temperature in optical scanning unit increases, and thereby optical scanning characteristic deteriorates. Further, a greater-sized circuit may increase production cost.

Further, the oscillating mirror 11 has an upper limit rating on electric current (i.e., electric current rating) or voltage when conducting the offset adjustment. Accordingly, the electric current used for offset adjustment cannot be set with unlimited or free manner even if the offset amount becomes greater. If the electric current becomes greater than the electric current rating, electronic elements may be damaged. Specifically, in a magnetic type drive unit used in an example embodiment, power consumption of direct current component becomes coil power loss (i.e., copper loss). Accordingly, if the offset adjustment amount becomes greater, temperature may increase due to generated heat, which may not be desirable.

In FIG. 9B, the offset may be adjusted in a direction shown by an arrow to set the offset within the allowable offset range, in which a control is conducted to set a computation value of the time interval A of the output of light receiving element PDa and a computation value of the time interval B of the output of PDb, shown in FIG. 7, becomes constant. Specifically, an averaging computation is conducted for several times for $A_1-B_1$, $A_2-B_2$, ... and it is determined whether the offset is within the allowable offset range using a comparison unit 71 of oscillating mirror control unit (see FIG. 11A(a)). If the offset is within the allowable offset range, an offset control is not conducted, and if the offset is not within the allowable offset range, an offset control is conducted.

FIG. 10 shows an example of phase shift of wave pattern having a given amplitude for the oscillating mirror 11. If the phase shift occurs as shown in FIG. 10, the wave pattern may be shifted in a direction shown by an arrow to correct the phase of wave pattern. Such phase correction control is conducted by setting a phase between a reference phase clock and PDa output (see FIG. 7) at a constant level, wherein the reference phase clock is used to generate a signal to drive the oscillating mirror 11. As shown in FIG. 7, a time interval C between the reference phase clock and PDa output is checked and controlled to be at a constant level. Specifically, averaging computation is conducted for a plurality of times for the time interval $C_1$, $C_2$, ... to control the computation value to a target value of zero. The PDa output occurs two times periodically when an optical writing operation is conducted as shown in FIG. 7. When counting the time interval C, the latter point of PDa output may be preferably used, wherein the latter point of PDa output is output right before starting an image forming process at an image forming area (or image writing area). The phase can be adjusted with higher precision at the latter point of PDa output, which corresponds to a right before image-writing starting side. If the former point of PDa output is used, the phase may not be adjusted with higher precision due to a phase shift, which may occur during an output timing of PDa.

In example cases of FIGS. 8 and 9B, if the amplitude or offset exceeds the allowable range, an optical scanning position in a main scanning direction may deviate from a desired position because an optical scanning speed may deviate from an ideal scanning speed. In FIGS. 8 and 9, an actual condition of amplitude is shown by a solid line, and an ideal condition of amplitude is shown by a dotted line. Such deviation of optical scanning position may cause image quality deterioration such as for example jitter in a main scanning direction, magnification ratio error in a main scanning direction, and the like. Such problem may occur when a color image and/or monochrome image forming operation is conducted.

On one hand, the phase shift shown in FIG. 10 may cause a problem when a color image forming operation is conducted. When a color image forming operation is conducted as shown in FIG. 1, the oscillating mirror 11 is used to scan each photoconductor drum 3 using laser beams emitted from light sources of each color based on image signals. If the phase shift occurs in such color image forming operation, scanning positions of laser beams of each color may deviate with each other, by which scanning positions of each color in sub-scanning direction of one image (on the intermediate transfer belt 2) may deviate each other, and thereby image-color misalignment, and fluctuation of color tone may occur, for example.

Figure 11A:
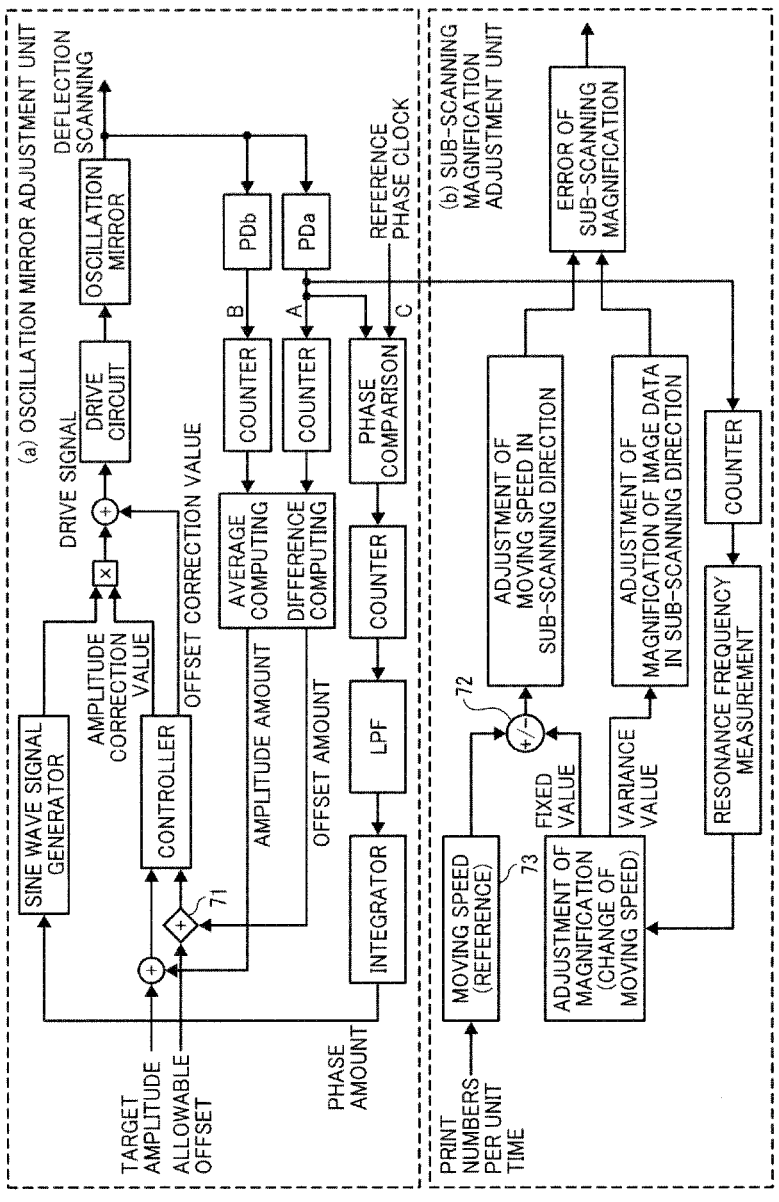
FIG. 11A shows a block diagram of control unit according to an example embodiment.
Figure 11B:
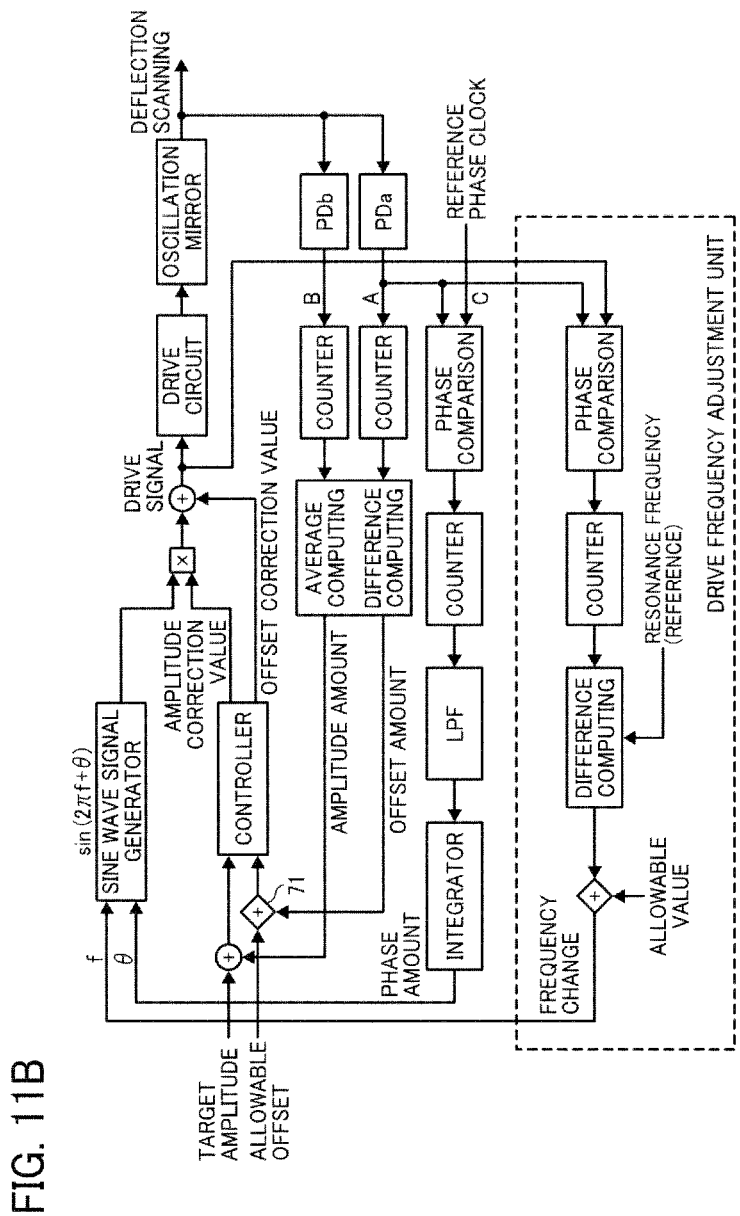
FIG. 11B shows a block diagram of another control unit according to an example embodiment.

FIGS. 11A and 11B illustrate block diagrams of control units used in an example embodiment. FIG. 11A(a) shows a control unit for the oscillating mirror 11 in a main scanning direction, and FIG. 11A(b) shows a control unit for magnification ratio in a sub-scanning direction.

The control unit for the oscillating mirror 11 shown in FIG. 11A(a) is used to control the amplitude, offset, and phase of the oscillating mirror 11. The laser beam used for a deflection scanning system scans the light receiving elements PDa and PDb. Then, the light receiving elements PDa and PDb output signals, which are counted by the counters A and B (see FIG. 11A/11B), respectively. The counters A and B measure the time intervals A and B, and then computation of (A+B)/2 is conducted and an average computation result of (A+B)/2 is compared with a target value of amplitude. Similarly, computation of difference "A−B" is conducted and an average computation result of "A−B" is compared with an allowable offset range to determine whether the average difference "A−B" is within the allowable offset range. If it is determined that the average difference is within the allowable offset range, no correction is conducted and the computation value is output to a controller. If it is determined that the average difference is not within the allowable offset range, a difference value between the computation value and the allowable offset range is computed, and then the offset is adjusted based on the difference value. As such, the offset amount may be set within the allowable offset range after the adjustment work, in which the offset amount may not need to be set to zero.

When the signals are output, error signals may be output due to electrical noises, which may occur abruptly. The averaging computation is conducted to reduce an effect of such error signals to the controlling of oscillating mirror 11. The averaging computation may be conducted with a given number of times such as from two to ten times, for example. If the number of averaging computation times is set too great, a correction timing may be delayed, and control deviation of oscillating mirror 11 may become greater.

Based on the comparison result, the controller computes correction amount for amplitude and offset of the oscillating mirror 11. Then, a drive signal of the corrected sine wave is amplified by a drive circuit of the oscillating mirror 11, and the oscillating mirror 11 is driven by such drive signal. The above-described control loop is used as an amplitude control loop and an offset control loop, and the offset control may be conducted after the amplitude control.

The phase control loop (see an arrow of FIG. 10) may be conducted after the amplitude control loop and offset control loop are correctly conducted, in which the amplitude and offset can be correctly controlled within a desired rage of target value. Then, the phase control loop is conducted to set a same phase for drive signal of the oscillating mirror 11 and oscillation angle of the oscillating mirror 11.

The phase control may need a higher precision control compared to the amplitude control and offset control. If all of such controls are conducted simultaneously, each control may interfere with other controls, in which drive signal may vary greatly, and thereby a time period to set parameters within a control target value range may take a longer time. Accordingly, the amplitude control may be conducted at first, then the offset control may be conducted, and the phase control may be conducted at last as a fine adjustment control to shorten a total time period to set parameters within a rang of control target value.

A phase comparator detects a phase deviation between an output signal of light receiving element PDa and a reference phase clock (see the time interval C in FIG. 7), and a counter PH (see FIGS. 11A and 11B) measures the phase deviation. The measurement result of phase deviation is then converted to direct current having a given voltage using a low pass filter (LPF) and an integrator. The phase locked loop (PLL) control can change phases based on the voltage of such current. A sine wave signal corresponding to such phase change can be generated by using a resolution level setting for phase change set in advance, which can be incremented or decremented for setting resolution levels stepwisely, by which the sine wave signal can be generated with a preferable phase. With such configuration, the phase control loop is conducted to set a same phase for drive signal of the oscillating mirror 11 and oscillation angle of the oscillating mirror 11.

The sine wave signal used for phase control has resolution levels, which may be generatable and set with higher precision that is more than a control allowable range. However, higher precision resolution levels may need more storage capacity such as a memory, which means cost increase. Accordingly, the generation resolution levels of sine wave signal may be set to a given value such as 50 μm or less, for example. For human eyes, image-color misalignment in a sub-scanning direction may be recognizable in the order of about 50 μm or more.

Figure 12:
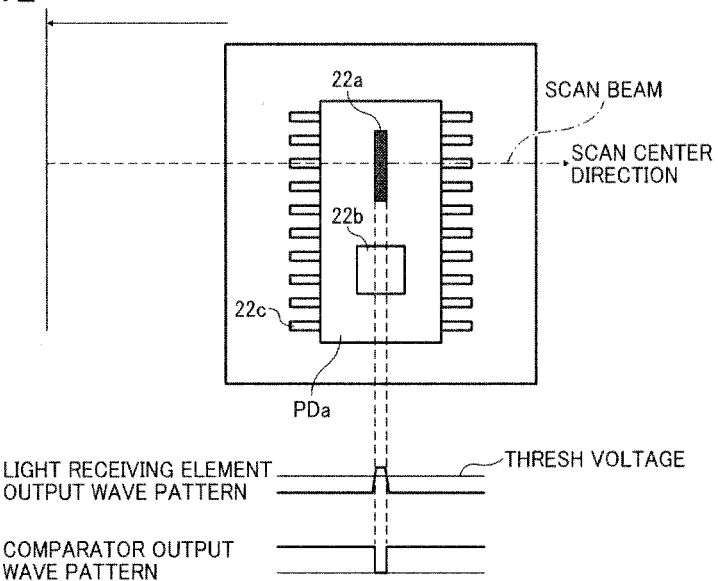
FIG. 12 illustrates a relation between a light receiving element and scan laser beam according to an example embodiment.

FIG. 12 shows the light receiving element PDa, which is scanned by a laser beam. The laser beam may scan the light receiving element PDa with a given beam spot diameter with a given scanning speed used for scanning a face of photoconductor drum 3 (see FIG. 1), by which optically equivalent laser beam may be used for scanning the photoconductor drum 3 and the light receiving element PDa. The light receiving element PDa may be disposed at a position extending from a scanning direction on the photoconductor drum 3. Further, depending on different layout of optical system, the light receiving element PDa may be disposed at a given position to receive the laser beam via a reflection mirror. The light receiving element PDa may include a PIN photodiode as a light receiving member, an amplification circuit to amplify output signals of PIN photodiode, and a comparator circuit to adjust and generate a wave pattern with a given pattern. For example, the light receiving element PDa is prepared as one package unit having an integrated circuit (IC) and a laser beam passing member made of resin such as for example a light receiving member 22a, a circuit unit 22b, an IC lead 22c shown in FIG. 12. When a scan beam passes the light receiving member 22a, a comparator output signal is generated (see FIG. 12).

As shown in FIG. 12, in a dotted line area of the scan beam, the light source is deactivated or the light intensity is reduced to a level that an intensity of flare light does not become a level that forms a latent image on a photoconductor drum or the light receiving element PDa. If the light source is activated to emit the light beam in an area between a maximum oscillation angle of the oscillating mirror 11 and a vicinity of the light receiving element PDa, a ghost light may occur due to diffuse reflection by optical parts disposed in an optical scanning unit. Such ghost light becomes noise for signals of the light receiving elements PDa and PDb, by which the time intervals A, B, and C (see FIG. 7) may be disturbed, and thereby control error may occur and the control may not be conducted effectively. To prevent such ghost light, at a given timing, the light source is deactivated or the light intensity is reduced to a level that an intensity of ghost light does not become a level that forms a latent image on a photoconductor drum or the light receiving element PDa. Deactivation of light source or reduced light intensity can enhance longer lifetime for light source employing a semiconductor laser, and can suppress temperature increase of light source. The vicinity of light receiving element may mean an area for scanning position and timing, in which light is emitted to correctly measure the time intervals A, B, and C (see FIG. 7) without influence to the above described output of comparator circuit.

If reflection rate or light-passing rate of optical element becomes lower (due to over the time deterioration), light intensity becomes lower, which may cause a longer start-up time of threshold voltage (i.e., slower slope) used to determine the comparator output, by which error detection may occur. Such lower light intensity can be solved by controlling light intensity of light source at a constant level when scanning the light receiving element.

A description is now given to a control unit of magnification ratio in the sub-scanning direction with reference to FIG. 11A(b), which shows a block diagram of control unit of magnification ratio in the sub-scanning direction. Adjustment amount used for magnification ratio in the sub-scanning direction can be determined from the resonance frequency measurement using the output of PDa. Specifically, a time interval $D_1$ (see FIG. 7) is measured by a counter S, and then resonance frequency is computed and measured from the time interval $D_1$, wherein the frequency is computed as "frequency=1/(time interval)." The time interval $D_1$ may be computed by conducting the averaging computation for a plurality of times, wherein the averaging computation may be effective to reduce, in particular to remove, influence of minute electrical noise.

If too great noise occurs, the effect of averaging computation becomes smaller, by which the measurement value of resonance frequency may deviate significantly from a desired resonance frequency, in which abnormal image may be produced during an image forming operation. To prevent such drawback, a determination unit 72 may be disposed to determine whether the measurement value of resonance frequency is within a given range from a desired resonance frequency, wherein the resonance frequency can be determined from a reference value 73 of moving speed determined from the number of printable sheets per predetermined unit time. The determination unit 72 determines whether the measurement value of resonance frequency is, for example, within ±10% range of a desired resonance frequency. Such ±10% range may be set as a variation range of resonance frequency when the oscillating mirrors are manufactured. Specifically, when oscillating mirrors are manufactured, oscillating mirrors, not manufactured in ±10% range, are not to be installed in apparatuses. Accordingly, the measurement value of resonance frequency, which becomes out of such range, may not exist in apparatuses available in the market. If the measurement value is out of such range, such oscillating mirror may not be installed in an optical system.

Based on the measurement result of resonance frequency, an adjustment amount of magnification ratio can be determined. The adjustment amount of magnification ratio may include a base value and a variable value. The base value is a value that is measured when an image forming apparatus is activated (e.g., power source is ON) and stored in a storage as a base value of resonance frequency. The variable value is a value corresponding to an amount, which is changed from the base value after activating the image forming apparatus.

The reference value 73 of moving speed of photoconductor can be determined in advance from the number of printable sheets to be printed per predetermined unit time using one image forming apparatus. The number of printable sheets to be printed per predetermined unit time may take several different values depending on, for example, different thickness of print sheets to be used. Because toner fusing time may change depending on thickness of sheets, a plurality of different values may be set as the number of printable sheets for one image forming apparatus. The reference value 73 of moving speed is determined using a standard sheet having a standard thickness as one reference value (such as first reference value), and the reference value 73 of moving speed for other sheet having different thickness is determined as other reference value (such as second reference value) based on the number of printable sheets for such other sheet. As such, the number of printable sheets of image forming apparatus can be set for a plurality of different values depending on different sheet thickness, in which and one sheet may be used as a standard sheet to set a standard value (such as first reference value) for the reference value 73 of moving speed, and the reference value 73 of moving speed for other sheets having different thickness is set as other reference value (such as second reference value) based on the standard value set for the reference value 73. With such configuration, the reference value 73 of moving speed can be determined uniquely for each of different number of printable sheets.

When the image forming apparatus conducts printing operations using different sheets having different thickness, the reference value 73 of moving speed may be set for different sheets as follows. First, the reference value 73 is set for a standard sheet having standard thickness as a first reference value of moving speed. Then, the reference value 73 of moving speed is set for other sheet having other thickness as a second reference value of moving speed, wherein the second reference value is set based on the first reference value. Then, a third reference value of moving speed is set for other sheet having still other thickness based on the first reference value. For example, the reference value 73 of moving speed for different sheets having different thickness can be set one half, one third, one fourth, and so on as a fraction of the first reference value, in which the numerator of the fraction is one and the denominator is a whole number equal to or greater than 2. For example, if one image forming apparatus can use three types of sheets having different thickness (i.e., standard sheet, type I thickness sheet, type II thickness sheet), the reference value 73 for standard sheet is set to "1," and the reference value 73 for type I thickness sheet is set to one half (½) of the standard sheet thickness, and the reference value 73 for type II thickness sheet is set to one third (⅓) of the standard sheet thickness. Such "one n-th" setting is set because the oscillating mirror 11 uses the principle of resonance phenomenon. In a conventional system using a polygon mirror, a motor for driving a polygon mirror can be driven at any given rotation numbers because the rotation of motor can be changed continuously. However, the oscillating mirror 11 using the principle of resonance phenomenon cannot be driven at any frequency but can be driven only at a specific frequency. As such, the frequency for driving the oscillating mirror 11 cannot be changed continuously.

Specifically, when the reference value 73 of moving speed for standard sheet is set to "1," the light activation of laser beam is conducted for one time per one scanning process. Further, when the reference value 73 of moving speed is set to "½" for the type I thickness sheet, the light activation of laser beam is conducted for one time per two scanning processes, which means the laser beam is deactivated for one scanning process in the two scanning processes, by which sheets having the type I thickness sheet can be printed when the reference value 73 of moving speed is set to "½" of standard sheet. As such, the laser beam is activated for one scanning process and not activated for another scanning process. Similarly, when the reference value of moving speed is set to "⅓" for the type II thickness sheet, the light activation of laser beam is conducted for one time per three scanning processes, which means the laser beam is deactivated for two scanning process in the three scanning processes, by which sheets having the type II thickness sheet can be printed when the reference value 73 of moving speed is set to "⅓" of standard sheet, in which the laser beam is activated for one scanning process and not activated for another two scanning process. As such, by controlling the timing of light activation for each different setting, the oscillating mirror 11 can be driven at a given oscillating frequency for deflection scanning while effectively conducting printing operations for sheets having different sheet thickness, such as thick sheet, thicker sheet, or the like.

The determination unit 72 in the control unit of magnification ratio in the sub-scanning direction, shown in FIG. 11A (b), compares a moving speed value in sub-scanning direction converted from the base value of resonance frequency, and the reference value 73 of moving speed of photoconductor to compute an adjustment amount of moving speed of photoconductor in the sub-scanning direction. The base value, which is a measurement value of resonance frequency when an image forming apparatus is activated, is converted to a moving speed value in the sub-scanning direction, and the reference value 73 of moving speed is determined based on the number of printable sheets per predetermined unit time. The reference value 73 may be selected from a plurality of values corresponding to a plurality of variations of the number of printable sheets per predetermined unit time. For example, the number of printable sheets per predetermined unit time is changed depending on the sheet types such as for example sheet thickness. Then, a first adjustment unit adjusts the moving speed of photoconductor in the sub-scanning direction based on the computed adjustment amount.

Specifically, if a difference between the base value and the reference value 73 of moving speed of photoconductor is within a given rage such as delta δ, the reference value 73 can be used as the moving speed of photoconductor. On one hand, if the difference between the base value and the reference value 73 of moving speed of photoconductor is out of the delta δ, a moving speed of photoconductor is adjusted to the base value. The delta δ is set as a preferable difference range between the resonance frequency and drive frequency, which will be described later in detail.

The resonance frequency "fr" can be converted to the moving speed value "v" in the sub-scanning direction using formula 1.

$$v[\text{mm/sec}] = (fr[\text{Hz}] \times 25.4)/\text{DPI} \quad \text{(formula 1)}$$

In the formula 1, 25.4 is a constant of inch conversion (1 inch=25.4 mm), DPI indicates pixel density per inch in the sub-scanning direction as dot per inch (dpi) such as for example 600 dpi, and 1200 dpi. For example, when the resonance frequency fr is set to 3000 Hz and DPI is set to 600 dpi, the moving speed "v" in the sub-scanning direction becomes 127 mm/sec.

Further, the drive frequency "fd" can be computed from the reference value 73 of moving speed using formula 2.

$$fd[\text{Hz}] = (v[\text{mm/sec}] \times \text{DPI})/25.4 \quad \text{(formula 2)}$$

In the formula 2, 25.4 is a constant of inch conversion (1 inch=25.4 mm), DPI indicates pixel density per inch in the sub-scanning direction as dot per inch (dpi) such as for example 600 dpi, and 1200 dpi. For example, when the moving speed "v" in sub-scanning direction is 150 mm/sec and DPI is 600 dpi, the drive frequency fd becomes 3543 Hz.

The first adjustment unit conducts adjustment of the moving speed in the sub-scanning position by adjusting a rotation number of drive motor(s) used for driving the photoconductor drums 3Y, 3M, 3C, 3K (see FIG. 2). The drive motor is required to rotate at a higher precision, and thereby the phase locked loop (PLL) control is applied to set a constant rotation speed. An adjustment amount of rotation number of the drive motor is computed based on the adjustment amount of magnification ratio, and the clock of PLL control circuit used for the drive motor is changed for an amount corresponding to the adjustment amount of rotation number of the drive motor.

While the rotation number of drive motor of the photoconductor drum 3 is changed, a drive motor for driving the intermediate transfer belt 2, a drive motor for driving registration rollers for feeding sheets from the sheet feed unit 4 (not shown), and a drive motor for driving the fixing unit 7 may be adjusted with a similar adjustment ratio. If such motor control is conducted by the PLL control, the above-described PLL control can be preferably applied. When a plurality of drive motors is used for image forming operations, the plurality of drive motors may need to be adjusted together. If not, an image forming operation may encounter problems such as fluctuation of image writing start position in the sub-scanning direction on a print sheet, wrinkles on a print sheet in the sub-scanning direction or the like.

Further, a second adjustment unit conducts the magnification ratio adjustment in the sub-scanning direction of image data by conducting a given image processing such as data thinning to decrease a magnification ratio, or data interpolation to increase magnification ratio, for example.

Figure 13:
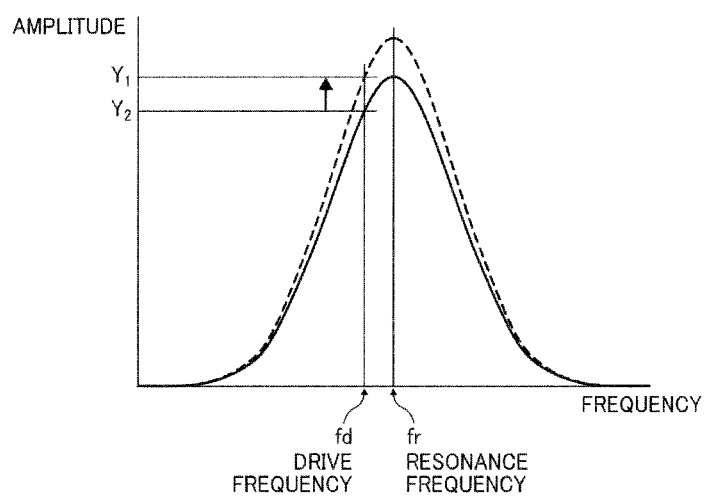
FIG. 13 illustrates a relation between drive frequency and resonance frequency of the oscillating mirror according to an example embodiment.

A description is given to the drive frequency fd of the oscillating mirror 11 with reference to FIG. 13. The drive frequency fd is used to operate an image forming operation under a given number of printable sheets. The drive frequency fd is preferably matched to the resonance frequency fr of the oscillating mirror 11 to gain an amplitude $Y_1$ (see FIG. 13) required for conducting an optical scanning process effectively. Such matching of drive frequency fd and resonance frequency fr can be shown as a solid line in FIG. 13, and in the above described example embodiment, the image forming conditions may be operated under a condition that the drive frequency fd is matched to the resonance frequency fr. However, under a given condition, the resonance frequency fr of the oscillating may vary or fluctuate, in which the drive frequency fd does not match to the resonance frequency fr of the oscillating mirror 11. If the drive frequency fd does not match the resonance frequency fr, the amplitude $Y_1$ required for the optical scanning process can be obtained by increasing the input energy (e.g., voltage, electric current) to the oscillating mirror 11.

When the resonance frequency fr is varied or fluctuated, the amplitude $Y_1$ may not be gained by oscillating the oscillating mirror 11 using the drive frequency fd, which is used before such resonance frequency variation occurs because such drive frequency fd may oscillate the oscillating mirror 11 with an amplitude $Y_2$ when the resonance frequency fr is varied or fluctuated, wherein the amplitude $Y_2$ is smaller than the amplitude $Y_1$ required for the effective optical scanning process. In such a case, to increase the amplitude of the oscillating mirror 11 to the amplitude $Y_1$, input energy (e.g., voltage, electric current) to the oscillating mirror 11 is increased. With such process, the amplitude of the oscillating mirror 11 can be increased to the amplitude $Y_1$ (dotted line in FIG. 13) and oscillated.

An allowable difference between the drive frequency fd and resonance frequency fr is determined in view of Q value of the oscillating mirror 11 and input energy limit. The allowable difference of "fd−fr/fd" may be set within a given range such as for example within 5% range. Such allowable difference is referred as delta δ. Within the allowable difference range, the input energy for the drive frequency fd can be increased to gain a preferable amplitude of the oscillating mirror 11. However, if the difference between the drive frequency fd and resonance frequency fr is determined to become too great and become out of the allowable difference range, the input energy to gain the preferable amplitude of the oscillating mirror 11 cannot be increased so much because the too great input energy may damage the oscillating mirror 11. Accordingly, if the difference between the drive frequency fd and the resonance frequency fr is determined to be out of the allowable difference range such as 5% range, the drive frequency fd is shifted and adjusted for some amount to decrease the difference of the drive frequency fd and the resonance frequency fr.

The magnification ratio in the sub-scanning direction may be adjusted as follows. For example, if the image forming apparatus, set to power-ON by activation, uses 150 mm/sec as the reference value 73 of moving speed of photoconductor in the sub-scanning direction, corresponding to a given number of printable sheets per predetermined unit time, the drive frequency fd is set to 3543 Hz by using the formula 2. In this case, the light source in the optical scanning unit is activated, and the oscillating mirror 11 is driven at 3543 Hz for deflection scanning, and such laser beam scans on the light receiving element PDa, by which the time interval D can be measured.

Although the resonance frequency fr is set to the oscillating mirror 11 when the oscillating mirror 11 is manufactured, the resonance frequency fr of the oscillating mirror 11 in an actual apparatus may change or vary over the time. Accordingly, to determine the resonance frequency fr of the oscillating mirror 11 in the actual apparatus, the drive frequency fd is variably changed to determine the resonance frequency fr of the oscillating mirror 11 in the actual apparatus. Specifically, the amplitude of the oscillating mirror 11 varies when the drive frequency fd is variably changed. During such process, an amplitude corresponding to one given drive frequency is determined to be become a maximum amplitude, and such frequency can be referred and used as the resonance frequency fr because the oscillating mirror 11 is in a resonance condition when the oscillating mirror 11 oscillates with the maximum amplitude. Such maximum amplitude occurs when the time interval A (FIG. 7) becomes a maximum value. As such, the time interval A is measured by changing the drive frequency fd to determine the resonance frequency fr of the oscillating mirror 11.

If the time interval D, which can set a maximum value for the time interval A, is 282.49 μsec, for example, the resonance frequency fr becomes 3540 Hz (=1/282.49), and the adjustment amount of magnification ratio becomes 0.08% (=(fd−fr)/fd=(3543−3540)/3543=0.08). Because the difference of 0.08% is within the allowable difference of 5%, the drive frequency fd of 3543 Hz is not adjusted, and the drive frequency fd of 3543 Hz can be used as the base value.

The measurement of resonance frequency may be conducted at any timing when the image forming operation is not conducted. For example, the measurement of resonance frequency may be conducted during an interval time of print outputting process, when no print job is conducted and the like. If the resonance frequency changes due to environment temperature change or changes over time and the like, and if the difference of the drive frequency fd and the resonance frequency fr is out of the allowable difference range such as 5% range, the drive frequency fd is changed and adjusted to change a reference value of moving speed of photoconductor.

Figure 14:
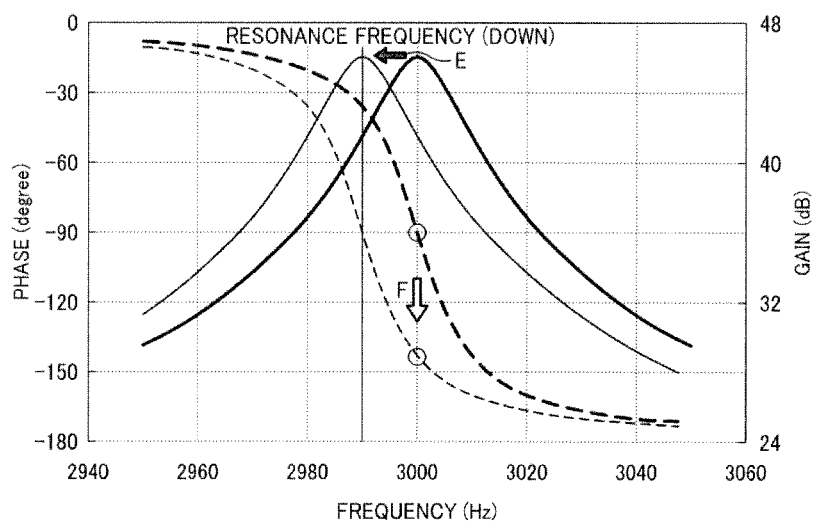
FIG. 14 shows a resonance frequency characteristic and phase characteristic of the oscillating mirror according to an example embodiment, in which resonance frequency is decreased.
Figure 15:
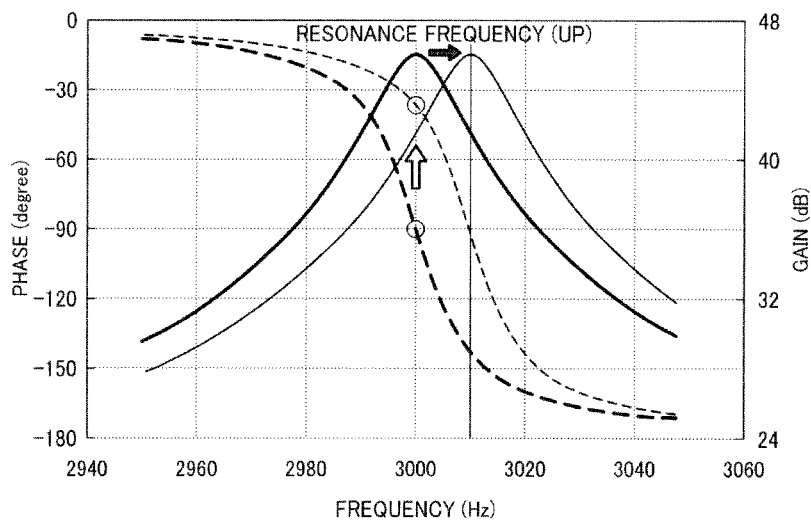
FIG. 15 a resonance frequency characteristic and phase characteristic of the oscillating mirror according to an example embodiment, in which resonance frequency is increased.

A description is now given to a method of detecting the difference between the resonance frequency fr and drive frequency fd of the oscillating mirror 11 with reference to FIGS. 14 and 15. FIGS. 14 and 15 show resonance frequency characteristic (i.e., amplitude gain) and phase characteristic of the oscillating mirror 11, in which the phase characteristic is observed as a phase difference between the initial resonance frequency and the drive frequency (or drive voltage wave pattern) to drive the oscillating mirror 11. The frequency characteristic and phase characteristic of initial resonance frequency is shown as a thick solid line and a thick dotted line, respectively. The amplitude "Gain" and phase characteristic "Phase" can be expressed by following formula 3 and formula 4.

$$\text{Gain} = \frac{\omega_0^2}{\sqrt{(\omega_0^2 - \omega^2)^2 + \left(\frac{\omega_0 \times \omega}{Q}\right)^2}} \quad \text{(formula 3)}$$

$$\text{Phase} = -\tan^{-1} \frac{\omega_0 \times \omega}{Q \times (\omega_0^2 - \omega^2)} \quad \text{(formula 4)}$$

In these formulas, the Q value indicates resonance state, and Q=200 is used in an example embodiment. $\omega_0 (=2\pi f_0)$ (rad/s) indicates a resonance frequency, and $f_0$=3000 Hz is used, for example. The gain and phase of the oscillating mirror 11 when the oscillating mirror 11 is driven under a frequency of $\omega(=2\pi f)$ can be obtained using the formula 3 and formula 4.

The resonance frequency of the oscillating mirror 11 may change when the rigidity of bar beam of the oscillating mirror 11 change due to a change of environment temperature. Such change of resonance frequency of the oscillating mirror 11 may occur in a direction shown by an arrow E in FIG. 14 or an arrow G in FIG. 15. FIG. 14 shows one example case that the resonance frequency changes when the environment temperature increases, and FIG. 15 shows another example case that the resonance frequency changes when the environment temperature decreases. The environment temperature is temperature that the optical scanning unit (including the oscillating mirror 11) is exposed. For example, temperature of heat-generating unit(s) in the image forming apparatus, and environment temperature around the image forming apparatus may be referred to as the environment temperature.

An example case shown in FIG. 14 is explained with reference to FIGS. 7 and 11B, in which the oscillating mirror 11, set with a resonance frequency of 3000 Hz and a drive frequency of 3000 Hz, is used, and such drive frequency and the resonance frequency of oscillating mirror 11 have a phase difference of minus ninety degrees (−90°), for example. When the environment temperature increases, the resonance frequency of oscillating mirror 11 changes and the phase characteristic of oscillating mirror 11 also changes as shown in FIG. 14. When the environment temperature increases, the resonance frequency of oscillating mirror 11 decreases in a direction shown by an arrow E while the drive frequency is still at a constant level. When the resonance frequency of oscillating mirror 11 changes, the phase characteristic of oscillating mirror 11 also changes, and such phase difference changes occurs in a direction shown by an arrow F in FIG. 14. By detecting such phase change, the variation of resonance frequency can be detected.

In an example embodiment, when the resonance frequency is decreased for 10 Hz (from a thick solid line to a thin solid line in FIG. 14), the phase changes from −90° to −144° as shown in FIG. 14, wherein the phase can be computed using the formula 4. Such changed phase amount of −54° can be detected by measuring a time interval P between a drive voltage signal (or drive reference signal) and an output of light receiving element PDa. The time interval P shown in FIG. 7 may be preferably computed by conducting an averaging computation of time intervals $P_1, P_2, \ldots$ for a plurality of times. Because the light receiving element PDa is not disposed at a position of scan center, phases such as −90° and −144° cannot be detected directly. The phase change or difference can be detected by using an equation of $P=(-90°-\Delta°)$, in which $\Delta$ is phase deviation amount from the scan center. Accordingly, the phase change or difference can be detected by measuring the variation of time interval P.

The block diagram of FIG. 11B includes a drive frequency adjustment unit encircled by a dotted line. The phase difference between the drive frequency (or drive signal) and the output signal of light receiving element PDa can be measured by a phase comparator and a counter. Then, the phase difference with respect to a reference resonance frequency is computed. If such difference is out of an allowable range, the drive frequency is changed or adjusted to match the drive frequency and the resonance frequency.

The allowable range may be set based on a limit value, which can correct the amplitude decline caused by variation or fluctuation of resonance frequency. The declined amplitude can be corrected to a desired amplitude, controlled at a constant level, by increasing the drive voltage. Accordingly, the upper limit of drive voltage may be determined based on a withstand voltage value of drive circuit and a tolerance withstand voltage of the oscillating mirror 11. Specifically, the withstand voltage value of drive circuit and tolerance withstand voltage of the oscillating mirror 11 is compared to determine a lower withstand voltage, which can be used as the allowable range for correcting the difference. In an example embodiment, the tolerance withstand voltage of oscillating mirror 11 is used as the lower withstand voltage, and ±10 Hz is used to as the allowable range.

Such process for detecting the difference between the resonance frequency and the drive frequency of oscillating mirror 11 may be conducted while controlling the amplitude of oscillating mirror 11 at a constant level. If the amplitude is not at a constant level, a timing of outputting signal from the light receiving element PDa may change, and affect a measurement of the time interval P.

Because adjustment of the drive frequency may change the scanning characteristic of scan beam, the adjustment of drive frequency may be required to conducted at a given preferable timing. Such preferable timing may be determined using a determination unit, which determines whether the surface of scanned object is being scanned by the laser beam or determines whether image information is input to the light source in the optical scanning unit. If the determination unit determines that the surface of scanned object is not being scanned by the laser beam, such timing may be preferably used to adjust the drive frequency. Such timing may be referred to as "image-not-forming timing." Even during such image-not-forming timing, the scan beam can be deflected to the light receiving elements PDa and PDb. The image-not-forming timing may mean an interval timing between image printing operations on sheets, an interval timing between print jobs, for example, but not limited thereto.

Further, another preferable timing can be set as follows without any consideration whether an actual scanning process using the laser beam is conducted on the surface of scanned object. Specifically, such frequency adjustment can be conducted whenever the frequency range becomes out of a desired range, in which frequency variation may be adjusted by changing the frequency stepwisely such as incrementally or decrementally. For example, if the frequency difference becomes out of 10 Hz range and becomes 11 Hz, the drive frequency is not changed for 11 Hz with one single step, but may be changed stepwisely by taking a plurality of steps for adjustment, in which the drive frequency may be changed stepwisely for 0.1 Hz unit for each individual step, in which 110 steps may be used for changing the drive frequency for 11 Hz. The time period required for frequency change between the start and completion of adjustment process may be a time enough for conducting an image forming operation on one single print sheet, for example. If the frequency change can be conducted slowly, image quality deterioration can be reduced.

In a conventional resonance frequency measurement, the gain characteristic may be measured by suspending or stopping an image forming operation conducted by an optical scanning unit temporarily, in which an amplitude of the drive frequency is measured while sweepingly changing the drive frequency, and a frequency corresponding to a maximum amplitude of the drive frequency is determined as a resonance frequency. Accordingly, an image forming apparatus (or optical scanning unit) cannot be used for image forming operation during such frequency measurement, which is not preferable.

In the above described example embodiment, the difference of the resonance frequency and drive frequency of oscillating mirror 11 can be detected at any timing when the oscillating mirror 11 is used for deflection scanning. For example, if the laser beam scans at least the light receiving elements PDa and PDb and the output signal can be output from the light receiving elements PDa and PDb, the difference of the resonance frequency and drive frequency of the oscillating mirror 11 can be detected while the laser beam does not scan an image writing area (or image forming area). Accordingly, the image forming apparatus is not required to suspend or stop an image forming operation even when the difference of resonance frequency and drive frequency of the oscillating mirror 11 is detected.

In the above described example embodiment, when the difference of resonance frequency and drive frequency of oscillating mirror 11 is detected, the drive frequency may be adjusted for each time such difference is detected even if the difference is within an allowable range. If the drive frequency is adjusted as such, the magnification ratio in the sub-scanning direction used for image forming operations may change, by which a correction process may be required for the magnification ratio in the sub-scanning direction. Such correction of magnification ratio in the sub-scanning direction position may need a magnification ratio correction by given image processing steps and a speed adjustment in sub-scanning direction for units such as photoconductor drum, intermediate transfer belt, sheet feed unit, fixing unit, or the like. If such correction and adjustment are conducted, a relatively longer time may be required due to a complex process and time lag, in which an image forming operation may be suspended for some time. Accordingly, it may be preferable not to change the drive frequency as much as possible in view of image quality of an image forming apparatus.

In the above described example embodiments, the drive voltage wave pattern uses a sine wave, but the drive voltage wave pattern is not limited to the sine wave, but other wave pattern such as square wave, triangular wave, or the like can be similarly used with a similar effect.

As such, by employing the oscillating mirror 11 as the optical deflector, power consumption can be reduced, temperature increase of scanning lens in the optical scanning unit can be reduced, temperature variation in the optical scanning unit and vibration of the optical scanning unit can be reduced, in particular prevented, by which image quality can be maintained at a good level over time, and magnification ratio error of print image in the sub-scanning direction can be reduced, in particular prevented, by which image deterioration can be reduced.

Figure 16:
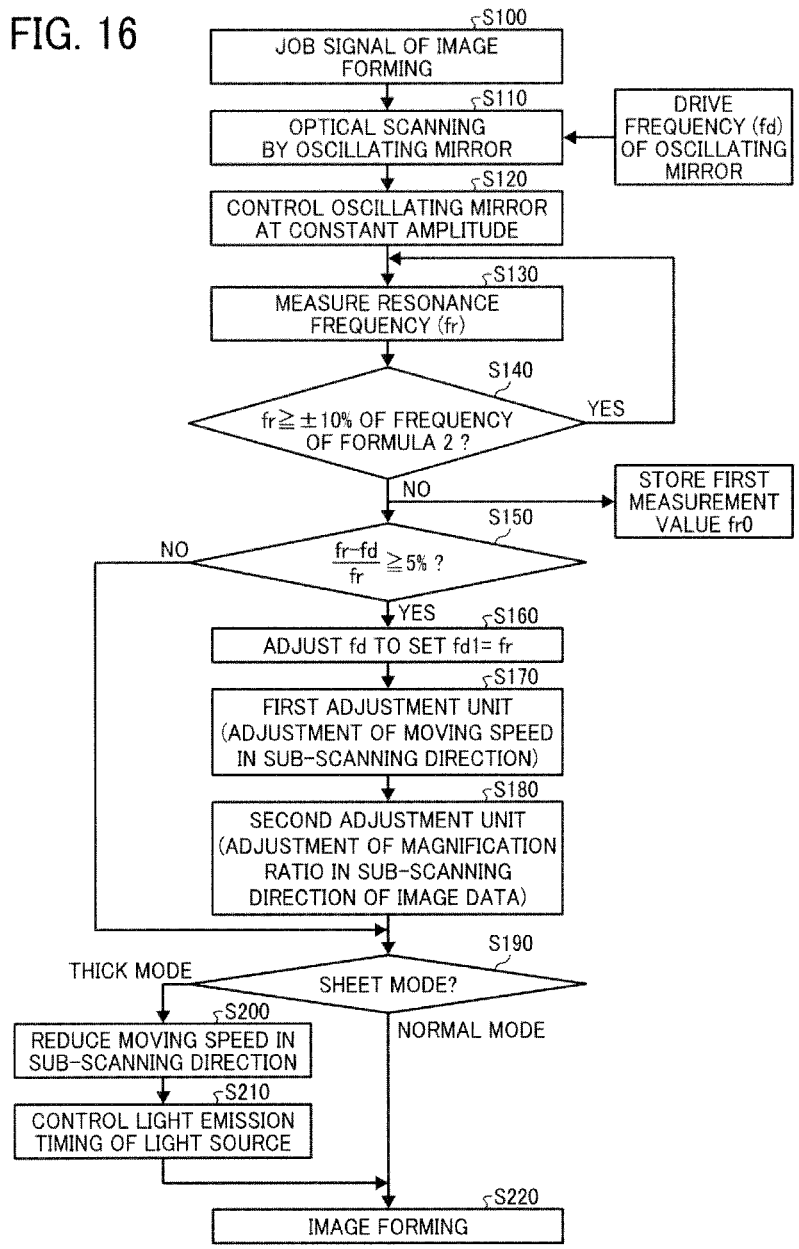
FIG. 16 shows a flowchart of adjustment of magnification ratio in a sub-scanning direction when a drive frequency of the oscillating mirror is adjusted.

In the above described example embodiment, the adjustment of magnification ratio in the sub-scanning direction when the drive frequency of oscillating mirror 11 is adjusted can be conducted with a process shown in FIG. 16, which shows a flowchart for adjustment of magnification ratio in the sub-scanning direction. When a job signal for image signal is transmitted (S100), the oscillating mirror 11 conducts an optical scanning (step S110). The oscillating mirror 11 is driven by the drive frequency fd, and such drive frequency fd may be determined when the oscillating mirror is designed, or by a reference value of moving speed in the sub-scanning direction. While driving the oscillating mirror 11 at a constant amplitude (step S120), the resonance frequency fr of oscillating mirror 11 is measured (step S130), and it is determined whether the measured resonance frequency fr is in a given range (step S140), in which the determination is conducted using a computed value of the above described formula 2 (fd=(v×DPI)/25.4, v: moving speed in sub-scanning direction), and it is determined whether the measured resonance frequency fr is in a given range such as for example ±10% range. If the measured resonance frequency fr is out of the ±10% range (step S140: yes), the resonance frequency fr is measured again because such measurement result may be possibility of miss-measurement. If the measured resonance frequency fr is within the ±10% range (step S140: No), a difference of the resonance frequency fr and drive frequency fd is determined using the equation of "fr−fd/fr" (step S150). If the difference "fr−fd/fr" is within a given range such as for example ±5% (step S140: No), the process goes to the sheet mode selection (step S190). If the difference "fr−fd/fr" is out of the given range (step S140: Yes), the drive frequency fd is adjusted or controlled to a frequency that can be matched to the resonance frequency fr (step S160). When the drive frequency fd is matched to the resonance frequency fr, the drive frequency fd is changed to a drive frequency fd1. When the drive frequency of oscillating mirror is changed, the magnification ratio in the sub-scanning direction also changes. Accordingly, an adjustment of magnification ratio in the sub-scanning direction is required. Based on the difference of drive frequency fd (before change) and drive frequency fd1 (after change), the first adjustment unit adjusts a moving speed in the sub-scanning direction, in which the first adjustment unit adjusts a moving speed of photoconductor in the sub-scanning direction (step S170). Such adjustment of moving speed of photoconductor in the sub-scanning direction can be conducted by the PLL control, for example. Further, the second adjustment unit may adjust the magnification ratio of image data in the sub-scanning direction (step S180), in which data thinning is used when the image data is reduced, and data interpolation is used when the image data is enlarged. If the difference "fr−fd/fr" is within the given range (step S140: No) or the magnification ratio of image data in the sub-scanning direction is adjusted (steps 170 and 180), the process goes to the sheet mode selection (step S190). The sheet mode selection may be conducted based on, for example, thickness of paper, in which types of paper such as normal thickness mode (or normal mode), thick mode, or the like may be determined. Typically, the moving speed of photoconductor in the sub-scanning direction for an image forming operation is set to a speed corresponding to the normal mode. Accordingly, the moving speed in the sub-scanning direction for the normal mode may not need any adjustment, and the process goes to the image forming (step S220). When the thick mode is selected at step S190, the moving speed in the sub-scanning direction is reduced (step S200), and the light emission timing of light source is controlled (step S210), and then the image forming (step S220) is conducted. The reducing of moving speed in the sub-scanning direction and the control of the light emission timing of light source can be conducted by the above described method. With such a configuration, the adjustment of magnification ratio in the sub-scanning direction when the drive frequency of oscillating mirror 11 is adjusted is completed. Although the sheet thickness is used for the sheet mode selection, other features can be used for sheet mode selection. For example, sheet type information such as plain paper, non-plain paper (e.g., coated paper) can be used for the sheet mode selection, but not limited thereto. Further, the above-described configuration can be similarly effective for any sheet material such as paper, non-paper sheet.

With the above-described configuration, while securing energy saving and image stability over time for an image forming apparatus, an image deterioration such as image magnification ratio error in a sub-scanning direction can be prevented.

With the above-described configuration, based on the measurement value of resonance frequency, each of adjustment units can use the base value and the variable value, respectively. As for the frequency adjustment, the variable value is used to conduct a fine adjustment control in image processing, by which an adjustment time can be shortened. Further, such a configuration may be effective to handle various types of print sheet in an image forming apparatus.

With the above-described configuration, even if the resonance frequency of oscillating mirror deflector varies, input energy can be set to an appropriate level, by which damage to the oscillating mirror deflector can be prevented.

With the above-described configuration, an optical scanning unit and an image forming apparatus can be reduced in size.

With the above-described configuration, resonance frequency can be measured with a higher precision, and image deterioration such as magnification ratio error in the sub-scanning direction deterioration can be reduced for an image forming apparatus.

The above described optical scanning unit and image forming apparatus can reduce power consumption, temperature increase of scanning lens, temperature variation in the optical scanning unit, and vibration of the optical scanning unit. Resultantly, image quality can be maintained at a good level over time, and magnification ratio error in the sub-scanning direction of print image and image deterioration can be reduced. As such, the above described optical scanning unit can be preferably used as a laser-raster optical writing system or unit employed for an image forming apparatus.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming apparatus comprising:
   an optical scanning unit including a plurality of light sources to emit laser beams, a single oscillating mirror deflector to deflect the laser beams used for scan processing in a main scanning direction, and a scan-focusing member to focus the deflected laser beams onto a plurality of photoconductors;
   a measurement unit to measure a resonance frequency of the oscillating mirror deflector;
   a first adjustment unit to adjust a speed of the photoconductors in a sub-scanning direction; and
   a second adjustment unit to adjust a magnification ratio of image data in the sub-scanning direction,
   the first adjustment unit and the second adjustment unit adjusting the image magnification ratio of image data in the sub-scanning direction depending on the resonance frequency as measured by the measurement unit.

2. The image forming apparatus of claim 1, wherein the first adjustment unit adjusts a base value corresponding to a resonance frequency of the oscillating mirror deflector measured when the image forming apparatus is activated, and the second adjustment unit adjusts a variable value corresponding to a value, which changes from the base value.

3. The image forming apparatus of claim 2, further comprising a determination unit to determine a difference between a reference value for the speed of the photoconductors and the base value,
   wherein a maximum number of printable sheets per predetermined unit time is set for the image forming apparatus in advance for a given type of sheet usable in the image forming apparatus,
   the speed of the photoconductors determined to correspond to the maximum number of printable sheets per predetermined unit time is used as the reference value for setting the speed of the photoconductor, and
   the first adjustment unit adjusts the speed in the sub-scanning direction based on the difference obtained by the determination unit.

4. The image forming apparatus of claim 3, wherein the speed of the photoconductor is changeable depending on the number of printable sheets per predetermined unit time between a first reference value, for when the maximum number of printable sheets per predetermined unit time is set, and a second reference value, for when the number of printable sheets per predetermined unit time is set smaller than the maximum number of printable sheets per predetermined unit time is set, the second reference value being a fraction of the first reference value in which the numerator of the fraction is one and the denominator is a whole number equal to or greater than 2.

5. The image forming apparatus of claim 1, further comprising a drive frequency adjustment unit to adjust a drive frequency for driving the oscillating mirror deflector to maintain a difference between the drive frequency and the resonance frequency of the oscillating mirror deflector within a given predetermined range.

6. The image forming apparatus of claim 1, wherein the laser beams emitted from the plurality of light sources enter a reflector of the oscillating mirror deflector at a given angle to the sub-scanning direction, and the plurality of laser beams deflected at the reflector of the oscillating mirror deflector deflect in substantially the same direction for scan processing in the optical scanning unit.

7. The image forming apparatus of claim 1, wherein the optical scanning unit further includes a light receiving element disposed at a position corresponding to a scan area of a laser beam used for deflection scanning,
   wherein the measurement unit measures a frequency of the oscillating mirror deflector by computing a time interval between successive output signals from the light receiving element outputted when the light receiving element receives the laser beam, for a plurality of times.

8. The image forming apparatus of claim 1, wherein the optical scanning unit further includes a first receiving element and a second receiving element disposed at positions corresponding to a scan area of a laser beam used for deflection scanning,
   wherein the measurement unit detects a time interval between an output signal outputted from the first light receiving element and an output signal outputted from the second light receiving element, outputted when the first light receiving element and the second light receiving elements respectively receive the laser beam while an amplitude of the oscillating mirror deflector is kept constant, and the measurement unit measures a resonance frequency of the oscillating mirror deflector based on a time interval detection result.

9. An optical scanning unit for an image forming apparatus, comprising:
   a plurality of light sources to emit laser beams;
   a single oscillating mirror deflector to deflect the laser beams used for scan processing in a main scanning direction;
   a scan-focusing member to focus the deflected laser beams onto a plurality of photoconductors;
   a measurement unit to measure a resonance frequency of the oscillating mirror deflector;
   a first adjustment unit to adjust a speed of photoconductors in the sub-scanning direction; and
   a second adjustment unit to adjust a magnification ratio of image data in the sub-scanning direction,
   wherein, depending on the resonance frequency as measured by the measurement unit, an image magnification ratio of image data in the sub-scanning direction position is adjusted using the first adjustment unit and the second adjustment unit.

10. The optical scanning unit of claim 9, wherein the first adjustment unit adjusts a base value corresponding to a resonance frequency of the oscillating mirror deflector measured when the image forming apparatus is activated, and the second adjustment unit adjusts a variable value corresponding to a value, which changes from the base value.

11. The optical scanning unit of claim 10, further comprising a determination unit to determine a difference between a reference value for the speed of the photoconductors and the base value,
- wherein a maximum number of printable sheets per predetermined unit time to one type of sheet usable in the image forming apparatus is set for the image forming apparatus in advance,
- the speed of the photoconductor determined to correspond to the maximum number of printable sheets per predetermined unit time is used as the reference value for the speed of the photoconductor, and
- the first adjustment unit adjusts the speed in the sub-scanning direction based on the difference obtained by the determination unit.

12. The optical scanning unit of claim 11, wherein the speed of the photoconductor is changeable depending on the number of printable sheets per predetermined unit time between a first reference value, for when the maximum number of printable sheets per predetermined unit time is set, and a second reference value, for when the number of printable sheets per predetermined unit time is set smaller than the maximum number of printable sheets per predetermined unit time is set, the second reference value is a fraction of the first reference value in which the numerator of the fraction is one and the denominator is a whole number equal to or greater than 2.

13. The optical scanning unit of claim 9, further comprising a drive frequency adjustment unit to adjust a drive frequency for driving the oscillating mirror deflector to maintain a difference between the drive frequency and the resonance frequency of the oscillating mirror deflector within a given predetermined range.

14. The optical scanning unit of claim 9, further comprising a light receiving element disposed at a position corresponding to a scan area of a laser beam used for deflection scanning,
- wherein the measurement unit measures a frequency of the oscillating mirror deflector by computing a time interval between successive output signals from the light receiving element outputted when the light receiving element receives the laser beam, for a plurality of times.

15. The optical scanning unit of claim 9, further comprising a first receiving element and a second receiving element disposed at positions corresponding to a scan area of a laser beam used for deflection scanning,
- wherein the measurement unit detects a time interval between an output signal outputted from the first light receiving element and an output signal outputted from the second light receiving element, outputted when the first light receiving element and the second light receiving elements respectively receive the laser beam, while an amplitude of the oscillating mirror deflector is kept constant, and the measurement unit measures a resonance frequency of the oscillating mirror deflector based on a time interval detection result.

* * * * *